(12) United States Patent
Madisetti et al.

(10) Patent No.: US 11,556,928 B2
(45) Date of Patent: Jan. 17, 2023

(54) METHOD AND SYSTEM FOR FILTERING TRANSACTIONS USING SMART CONTRACTS AND UPDATING FILTERING SMART CONTRACTS

(71) Applicant: Vijay Madisetti, Johns Creek, GA (US)

(72) Inventors: Vijay Madisetti, Johns Creek, GA (US); Arshdeep Bahga, Chandigarh (IN)

(73) Assignee: Vijay Madisetti

( * ) Notice: Subject to any disclaimer, the term of this patent is extended or adjusted under 35 U.S.C. 154(b) by 0 days.

(21) Appl. No.: 17/647,926

(22) Filed: Jan. 13, 2022

(65) Prior Publication Data

US 2022/0138735 A1 May 5, 2022

Related U.S. Application Data

(60) Continuation of application No. 16/744,231, filed on Jan. 16, 2020, which is a division of application No. (Continued)

(51) Int. Cl.
*G06Q 20/38* (2012.01)
*H04L 9/32* (2006.01)
(Continued)

(52) U.S. Cl.
CPC ......... *G06Q 20/389* (2013.01); *G06Q 20/381* (2013.01); *H04L 9/3236* (2013.01);
(Continued)

(58) Field of Classification Search
CPC ............... G06Q 20/389; G06Q 20/381; G06Q 20/0655; G06Q 20/3829; H04L 9/3236;
(Continued)

(56) References Cited

U.S. PATENT DOCUMENTS 10,956,973 B1* 3/2021 Chang ................ G06Q 30/0611
11,416,942 B1* 8/2022 Leise ..................... G06N 20/00
(Continued)

FOREIGN PATENT DOCUMENTS

GB 2575172 * 5/2019

OTHER PUBLICATIONS

Filters and Events, downloaded from https://docs.web3j.io/4.8.7/advanced/filters_and_events/ webpage dated 2017-2019 (Year: 2019).*
(Continued)

*Primary Examiner* — James D Nigh
(74) *Attorney, Agent, or Firm* — Daniel C. Pierron; Widerman Malek, PL

(57) ABSTRACT

A method for filtering blockchain value transfer transactions and updating filtering including receiving a transaction request comprising an indication that the transaction request is associated with an update to an existing transaction smart contract, defining an updated transaction smart contract, applying a filter smart contract to the transaction request, and recording to a log an indication that the updated transaction smart contract was made to the existing smart transaction contract, responsive to the applying the filter smart contract.

8 Claims, 29 Drawing Sheets

Related U.S. Application Data

16/396,845, filed on Apr. 29, 2019, now abandoned, which is a continuation-in-part of application No. 15/976,910, filed on May 11, 2018, now Pat. No. 10,853,772.

(60) Provisional application No. 62/818,798, filed on Mar. 15, 2019, provisional application No. 62/652,341, filed on Apr. 4, 2018.

(51) Int. Cl.
    *H04L 9/00*         (2022.01)
    *G06Q 20/06*       (2012.01)
    *H04L 9/40*         (2022.01)

(52) U.S. Cl.
    CPC .............. *H04L 9/3268* (2013.01); *H04L 9/50* (2022.05); *H04L 2209/56* (2013.01)

(58) Field of Classification Search
    CPC ....... H04L 9/3268; H04L 9/50; H04L 9/3239; H04L 2209/56; H04L 63/12
    USPC .......................................................... 705/44
    See application file for complete search history.

(56) References Cited

U.S. PATENT DOCUMENTS

| | | | |
|---|---|---|---|
| 2017/0206604 A1* | 7/2017 | Al-Masoud | G06Q 40/08 |
| 2019/0013933 A1* | 1/2019 | Mercuri | G06F 16/904 |
| 2019/0080402 A1* | 3/2019 | Molinari | G06Q 20/3672 |
| 2019/0164153 A1* | 5/2019 | Agrawal | G06Q 20/383 |
| 2019/0220836 A1* | 7/2019 | Caldwell | G06Q 20/38215 |
| 2019/0228391 A1* | 7/2019 | Hu | G06Q 20/10 |
| 2020/0396065 A1* | 12/2020 | Gutierrez-Sheris | H04L 9/3239 |
| 2021/0342838 A1* | 11/2021 | Hoggard | G06Q 20/3829 |

OTHER PUBLICATIONS

Alharby et al. (Blockchain-Based Smart Contracts: A Systematic Mapping Study, Computer Science and Information Technology, Aug. 21, 2017, pp. 125-140) (Year: 2017).*

* cited by examiner

| Command | Purpose |
|---|---|
| GET | Retrieve information about an account, contract, transaction, exchange rate for a token |
| SEND | Send value from one account to another account in same network |
| XSEND | Send value from one account to another account in another network |
| REQUEST | Request value from an account in the same network |
| XREQUEST | Request value from an account in another network |
| RESPOND | Accept or deny a request received from an account in the same network |
| XRESPOND | Accept or deny a request received from an account in the another network |
| SIGN | Sign and approve a transaction |

FIG. 8

| Status Code | Purpose |
|---|---|
| 1xx | Request Received - For information purpose. E.g. A value transfer request is received and is being processed. |
| 2xx | Request Completed - The requested action has been successfully completed |
| 3xx | Request Pending - The VTTP command has been accepted, but the requested action is being held in abeyance, pending receipt of further information |
| 4xx | Client Error - The VTTP command was not accepted due to a client error and the requested action did not take place. |
| 5xx | Server Error - The VTTP command was not accepted due to a server error and the requested action did not take place. |

FIG. 16

| User | First Network Tethered Token Account | Second Network Tethered Token Account |
|---|---|---|
| Tom | -0.5 | |
| Mary | -1 | |
| Joe | -5.5 | |
| Jerry | -1 | |
| Alexis | | 3 |

FIG. 29

METHOD AND SYSTEM FOR FILTERING TRANSACTIONS USING SMART CONTRACTS AND UPDATING FILTERING SMART CONTRACTS

RELATED APPLICATIONS

This application is a continuation application of and claims priority under 35 U.S.C. § 120 of U.S. patent application Ser. No. 16/744,231 filed on Jan. 16, 2020 and titled Method and System for Exchange of Value or Tokens Between Blockchain Networks, which in turn is a divisional application of and claims priority under 35 U.S.C. § 120 of U.S. patent application Ser. No. 16/396,845 filed on Apr. 29, 2019 and titled Method and System for Exchange of Value or Tokens Between Blockchain Networks, which in turn claims priority under 35 U.S.C. § 119(e) of U.S. Provisional Patent Application Ser. No. 62/818,798 filed on Mar. 15, 2019 and titled A Use Case Extension to the Value Token Transfer Protocol, which in turn is a continuation-in-part application of and claims priority under 35 U.S.C. § 120 of U.S. patent application Ser. No. 15/976,910, now U.S. Pat. No. 10,853,772, issued Dec. 1, 2020 and filed on May 11, 2018 and titled Method and System for Exchange of Value or Tokens Between Blockchain Networks, which in turn claims priority under 35 U.S.C. § 119(e) of U.S. Provisional Patent Application Ser. No. 62/652,341 filed on Apr. 4, 2018 and titled Value Token Transfer Protocol—VTTP. The contents of these applications are incorporated herein by reference.

FIELD OF THE INVENTION

The present invention relates to Value Token Transfer Protocol (VTTP), a protocol for exchange of value or tokens within and between blockchain networks.

BACKGROUND OF THE INVENTION

Blockchain is a distributed and public ledger which maintains records of all the transactions. A blockchain network is a truly peer-to-peer network and it does not require a trusted central authority or intermediaries to authenticate or to settle the transactions or to control the network infrastructure. Users can interact and transact with the blockchain networks through Externally Owned Account (EOAs), which are owned and controlled by the users. Each EOA has a balance (in certain units of a Cryptocurrency associated with the Blockchain network) associated with it. EOAs do not have any associated code. All transactions on a blockchain network are initiated by EOAs. These accounts can send transactions to other EOAs or contract accounts. Another type of accounts support by second generation programmable Blockchain platforms are the Contract Accounts. A Contract Account is created and owned by an EOA and is controlled by the associated contract code which is stored with the account. The contract code execution is triggered by transactions sent by EOAs or messages sent by other contracts.

Blockchain networks can either be public or private. Public blockchain networks are free and open to all and any user can create an account and participate in the consensus mechanism on a public blockchain and view all the transactions on the network. Private blockchain networks are usually controlled and operated by a single organization and the transactions can be viewed only by the users within the organization. Public blockchain networks are usually unpermissioned or permissionless, as any node can participate in consensus process. Some public blockchain networks adopt a permissioned model where the consensus process is controlled by a pre-selected set of nodes. Private blockchain networks usually adopt the permissioned model. While public blockchain networks can be considered as fully decentralized, private blockchain networks are partially decentralized.

Organizations can have multiple private blockchain networks where each network is dedicated to a specific use case or department or business vertical. The blockchain networks within an organization may be created either using the same blockchain platform or technology or with different platforms or technologies.

On each blockchain network, a user can create multiple Externally Owned Accounts (EOAs). Each Externally Owned Account (EOA) has a public-private keypair associated with it. The account address is derived from the public key. When a new EOA is created, a keyfile is created which has the public and private keys associated with the account. The private key is encrypted with the password which is provided while creating the account. For sending transactions to other accounts, the private key and the account password are required.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are directed to a system and associated methods for exchange of value or tokens within and between blockchain networks.

In some embodiments, the method may further comprise a Value Token Transfer Protocol (VTTP) that provides the following features:

Intra-chain value transfer of native cryptocurrency (e.g. ETH on Ethereum blockchain);

Intra-chain value transfer of ERC20 tokens (e.g. sending OMG tokens and receiving SNT tokens);

Inter-chain value transfer of cryptocurrencies (e.g. Send ETH from Ethereum blockchain and receive LTC on Litecoin blockchain);

Intra and Inter-chain exchange of cryptocurrencies and ERC20 tokens (e.g. send BAT token from Ethereum blockchain and receive LTC on Litecoin blockchain); and Retrieve information on accounts, contracts, transactions for all participating blockchain networks.

In some embodiments, the method may further comprise client-server model in which VTTP works as a request-response protocol based on a client-server architecture, where a VTTP Client sends requests to a VTTP Server, and the server responds to the requests.

In some embodiments, the method may further comprise a peer-to-peer model in which VTTP works as a peer-to-peer protocol where VTTP Peers communicate directly with their peers and a VTTP Coordinator may be used for coordinating the communication between peers.

VTTP is blockchain platform or network independent. VTTP can be used to send any type of tokens between different blockchain networks or within a blockchain network, as long as the VTTP client and server know how to interpret and transfer tokens.

VTTP is a stateless protocol. Each VTTP request contains all the information required to process a request. VTTP client and server do not maintain state between successive requests.

Further embodiments may be directed to a blockchain value transfer method comprising receiving a plurality of transaction requests, each transaction request comprising a sending user account address, a receiving user account address, and a transaction value expressed in terms of a quantity of first in-network tokens, the user account addresses being addresses on a blockchain network. The method further comprises performing a balance check procedure on each transaction request comprising identifying a present permitted transaction amount in first in-network tokens for the sending user account address, and determining if the transaction value in first in-network tokens is greater than the present permitted transaction amount of the sending user account address. Upon determining the transaction value in first in-network tokens is greater than the present permitted transaction amount in first in-network tokens of the sending user account address, the method may continue with refusing the transaction. Upon determining the transaction value is not greater than the present permitted transaction amount of the sending user account address, the method may continue with adding the transaction request to an aggregate transaction record, updating the present permitted transaction amount of the sending user account address reflecting a debit of the transaction value, and updating the present permitted transaction amount of the receiving user account address reflecting a credit of the transaction value. The method may further comprise determining a net transaction amount for each user account address for each transaction in the aggregate transaction record, with the transaction value for transactions including the user account address as the sending user account address as a debit and as the receiving user account address as a credit and executing the net transaction amount for each user account address associated with the net transaction amount by transacting tokens to and from the user account addresses upon reaching an aggregation threshold, comprising withdrawing an amount of tokens from user account addresses with a net debit having a value equal to the value of the net debit, defined as debit user account addresses, defining debited tokens and depositing an amount of tokens from the debited tokens to user account addresses with a net credit in an amount equal to the amount of the net credit, defined as credit user account addresses.

In some embodiments, execution of the net transaction amount may comprise recording a net transaction smart contract to the blockchain network, the net transaction smart contract comprising each of the user account addresses and the tokens transacted with each of the user account addresses. Furthermore, the net transaction smart contract may add a transaction fee to each token transaction for the user account addresses.

In some embodiments, the aggregation threshold may be defined as at least one of a length of time elapsing since a previous net transaction execution, a gross transaction amount, or a risk tolerance.

In some embodiments, each transaction request of the plurality of transaction requests may have an associated transaction request smart contract recorded on the blockchain network, defining a plurality of transaction request smart contracts. Each transaction request smart contract may comprise a transaction tax added to the transaction value.

In some embodiments, the method may further comprise, for each refused transaction, re-determining if the transaction value in first in-network tokens is greater than the present permitted transaction amount of the sending user account address after at least one of a first time interval and an intervening transaction involving the sending user account address, defining a transaction retry, for one or more of a fixed number of transaction retry attempts or after a second time interval.

In some embodiments, the method may further comprise a first sending user account address of a first transaction request of the plurality of transaction requests is on a first blockchain network comprising the first in-network token, a first receiving user account address of the first transaction request is on a second blockchain network and comprises a second in-network token, and the first receiving user account address is determined to be a credit user account address. Executing the net transaction amount for the receiving user account may further comprise exchanging an amount of first in-network tokens, equal in value to the net credit for the first receiving user account, defining a net credit value, for an amount of first tethered tokens having a value equal to the net credit value, the first tethered tokens being comprised by a first tethered token transfer record, recording a transaction to the first blockchain network of sending the first tethered token transfer record from the first blockchain network to the second blockchain network, recording a transaction to the second blockchain network of receiving the first tethered token transfer record at the second blockchain network from the first blockchain network, exchanging the first tethered tokens comprised by the first tethered transfer record for an amount of second in-network tokens having a value equal to the net credit value, defining a second blockchain network deposit, and depositing the second blockchain network deposit to the receiving user account address. Furthermore, the first tethered token may have a value thereof tethered to a first fiat currency, the first in-network token may have a first exchange rate with the first tethered token, and the second in-network token may have a second exchange rate with the first tethered token that is different from the first exchange rate.

In some embodiments, a first sending user account address of a first transaction request of the plurality of transaction requests may be on a first blockchain network comprising the first in-network token, a first receiving user account address of the first transaction request may be on a second blockchain network and comprises a second in-network token, and the first receiving user account address may be determined to be a credit user account address. Executing the net transaction amount for the receiving user account may comprise exchanging an amount of first in-network tokens, equal in value to the net credit for the first receiving user account, defining a net credit value, for an amount of first tethered tokens having a value equal to the net credit value, the first tethered tokens being comprised by a first tethered token transfer record, recording a transaction to the first blockchain network of sending the first tethered token transfer record from the first blockchain network to a tethered token exchange, exchanging the first tethered tokens comprised by the first tethered token transfer record for an amount of second tethered tokens having a value equal to the net credit value, the second tethered tokens being comprised by a second tethered token transfer record, recording a transaction to the second blockchain network of receiving the second tethered token transfer record at the second blockchain network from the tethered token exchange, exchanging the second tethered tokens comprised by the second tethered transfer record for an amount of second in-network tokens having a value equal to the net credit value, defining a second blockchain network deposit, and depositing the second blockchain network deposit to the receiving user account address. A value of the first tethered token may be tethered to a first fiat currency, a value of the second tethered token may be tethered to a second fiat currency different from the first fiat currency, the first in-network token may have a first exchange rate with the first tethered token, the second in-network token may have a second exchange rate with the second tethered token, and the first tethered token may have a third exchange rate with the second tethered token. The method may further comprise at least one of defining the first exchange rate responsive, the second exchange rate, and the third exchange rate responsive to the second fiat currency. The method may further comprise updating the present permitted transaction amount responsive to at least one of the first fiat currency and the second fiat currency.

BRIEF DESCRIPTION OF THE DRAWINGS

FIG. 8 is an illustration the VTTP commands, according to an embodiment of the invention.

FIG. 16 is an illustration of VTTP status codes, according to an embodiment of the invention.

FIG. 29 is an illustration of the result of an exemplary scenario of aggregation of transactions across two token networks, according to an embodiment of the invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Various types of computing hardware may be disclosed herein, e.g. server, computer, computerized device, smart phone, etc. Except where described otherwise, it is contemplated and included within the scope of the invention that such hardware may comprise a processor operable to execute software resulting in a described function, a memory device positioned in communication with the processor permitting the storage of software thereon as well as data generated or processed by the processor, and a communication device positioned in communication with the processor and, in some embodiments, the memory device, and is operable to send and receive data across any type of computer network as is known in the art. The memory device may be permanent and non-transitory.

Figure 1:
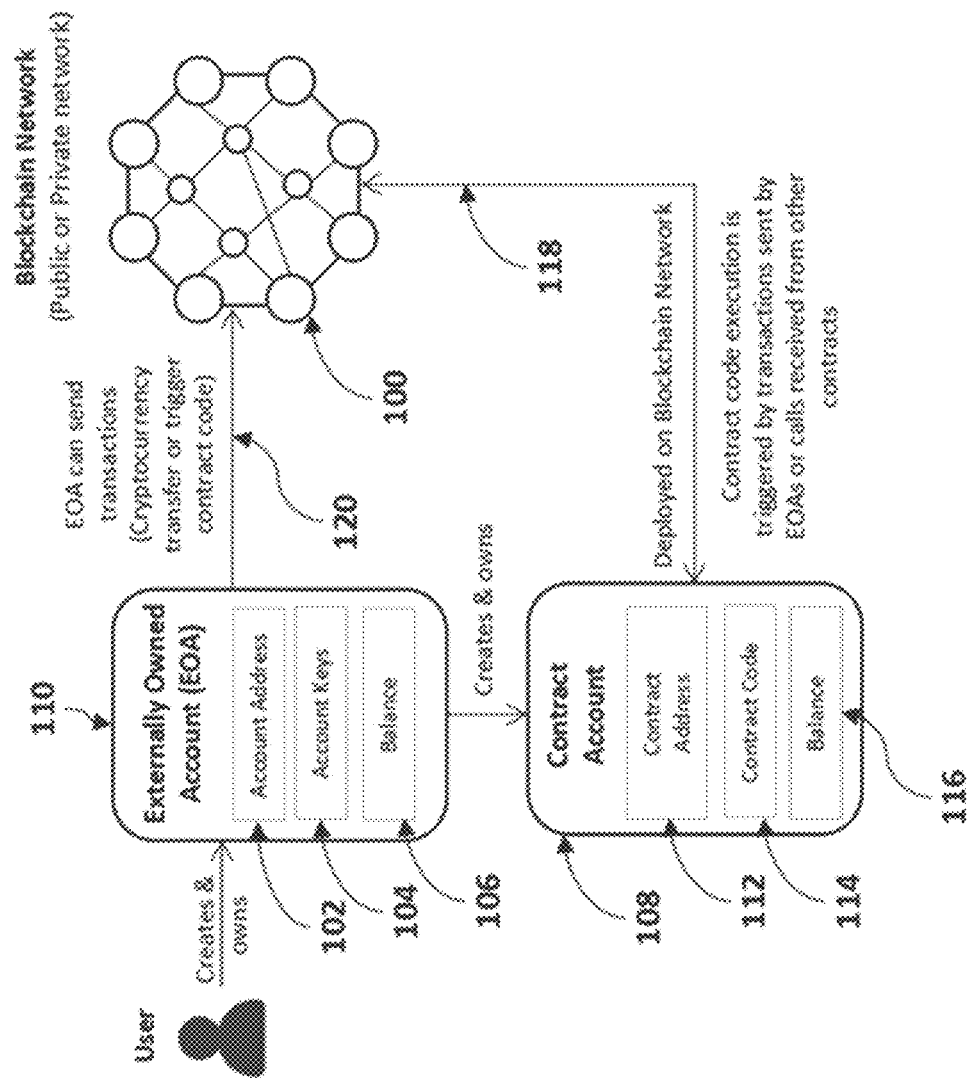
FIG. 1 is an illustration of the blockchain account types and interactions.

Referring now to FIG. 1, for example, and without limitation, blockchain account types and interactions between them, are described in more detail. Blockchain is a distributed and public ledger which maintains records of all the transactions. A blockchain network 100 is a truly peer-to-peer network and it does not require a trusted central authority or intermediaries to authenticate or to settle the transactions or to control the network infrastructure. Users can interact and transact with the blockchain networks through Externally Owned Account (EOAs) 110, which are owned and controlled by the users. Each EOA 110 has an account address 102, account public-private keys 104 and a balance 106 (in certain units of a Cryptocurrency associated with the Blockchain network) associated with it. EOAs do not have any associated code. All transactions 120 on a blockchain network are initiated by EOAs. These accounts can send transactions to other EOAs or contract accounts. Another type of accounts support by second generation programmable Blockchain platforms are the Contract Accounts 108. A Contract Account 108 is created and owned by an EOA 110, is located at a contract address 112, and is controlled by the associated contract code 114 which is stored with the contract account 108. Additionally, the contract account 108 may comprise a balance 116, which may be identical to the balance 106 of the EOA 110. The contract code 114 execution is triggered by transactions 118 sent by EOAs or messages sent by other contracts.

Figure 2:
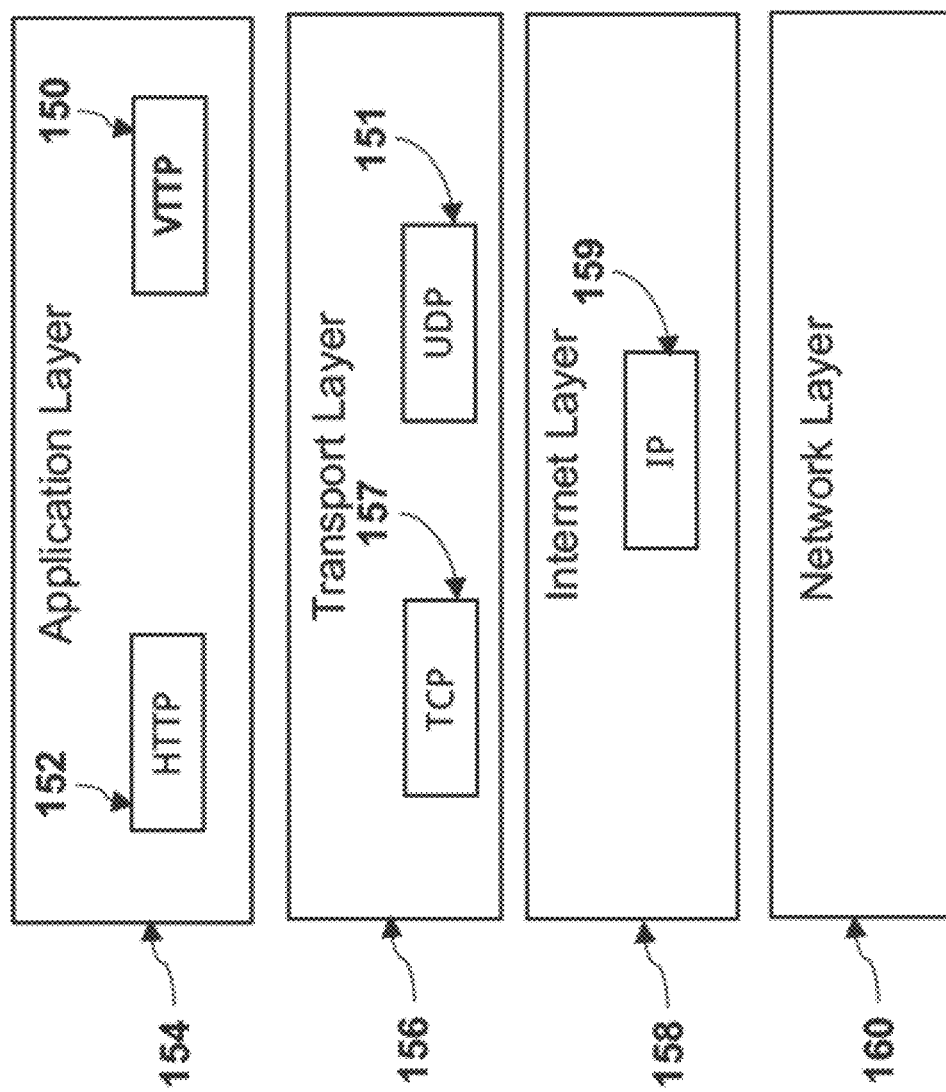
FIG. 2 is an illustration of the TCP/UDP/IP reference model layers with the VTTP protocol as part of the application layer, according to an embodiment of the invention.

Referring now to FIG. 2, the TCP/IP reference model layers with the VTTP protocol 150 as part of an application layer 154, is described in more detail. VTTP 150 is an application layer protocol and works alongside Hypertext Transfer Protocol (HTTP) 152 and on top of a transport layer 156 executing Transmission Control Protocol (TCP) 157 and an Internet layer 158 executing Internet Protocol (IP) 159. While TCP is specifically recited, all other transport layer protocols as are known in the art are contemplated and included within the scope of the invention, including, but not limited to, User Datagram Protocol (UDP), SCTP (Stream Controlled Transfer Protocol), and Quick UDP Internet Connections (QUIC). Additionally, while VTTP may operate over the Internet, it is contemplated and included within the scope of the invention that VTTP may operate over any Wide Area Network (WAN), Local Area Network (LAN), Personal Area Network (PAN), cellular network, and the like. Additionally, any communication medium is contemplated and included within the scope of the invention, including, but not limited to, Ethernet, fiber optical communication, cable communication, wireless communication (including radio, visible light, microwave, and any other electromagnetic transmission) such as IEEE 802.xx standards, and any other telecommunication standard, method, or medium. Moreover VTTP may be implemented on devices operating configured to communicate with other devices, i.e., the Internet of Things (IoT).

Figure 3:
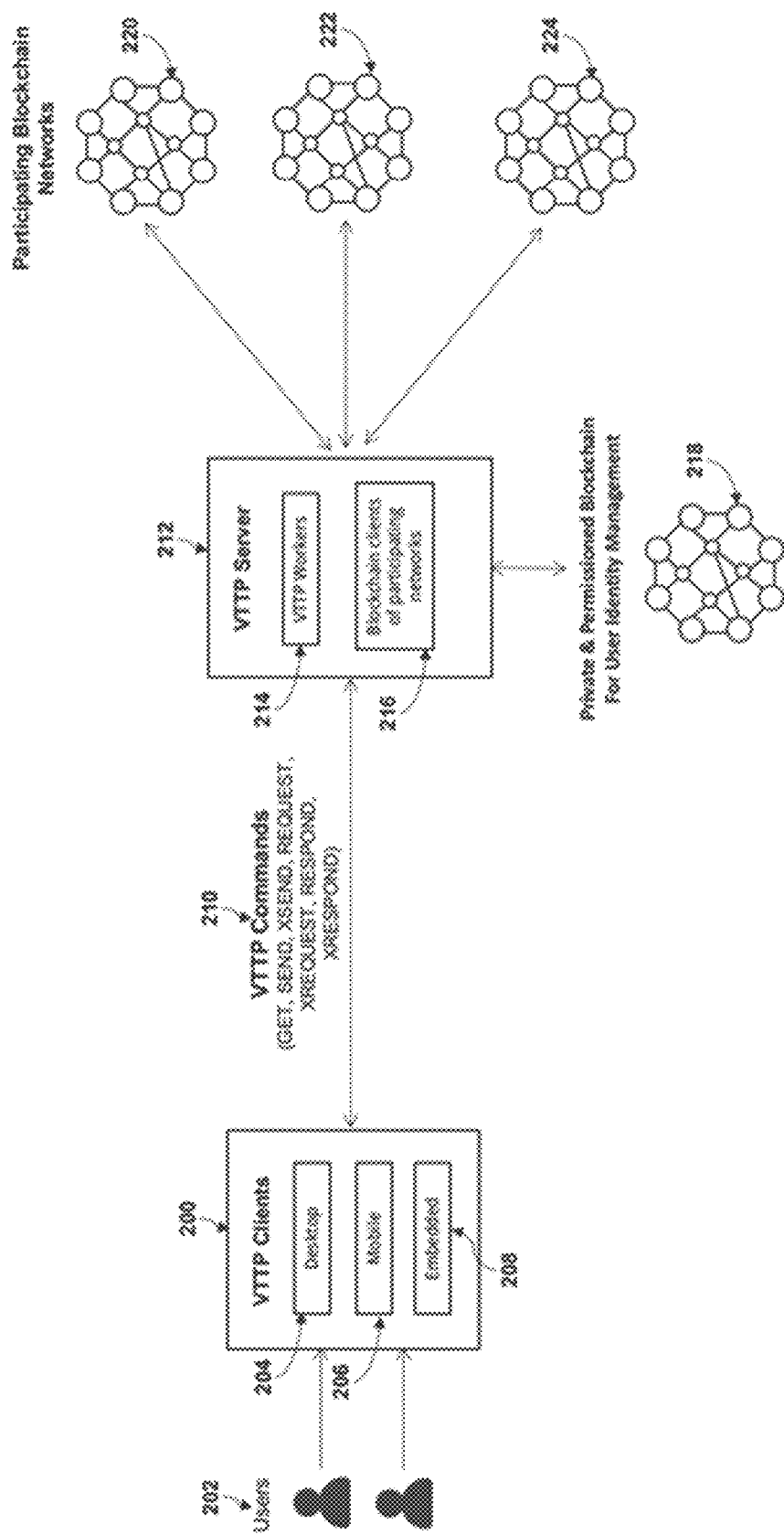
FIG. 3 is an illustration of the VTTP components, according to an embodiment of the invention.

Referring now to FIG. 3, the components of the Value Token Transfer Protocol (VTTP), are described in more detail. In one embodiment, VTTP works as a request-response protocol based on a client-server architecture, where a VTTP client 200 sends requests to a VTTP Server 212, and the server responds to the requests. The VTTP clients 200 may be available for different platforms and devices such as a desktop client 204, a mobile client 206 or an embedded client 208. Users 202 send VTTP requests to the VTTP server 212 using VTTP clients 200. VTTP requests contain VTTP commands 210 which are processed by the VTTP server 212. A VTTP server 212 may have one or more VTTP Workers 214 to process VTTP requests and execute the VTTP commands 210 sent by VTTP clients 200. VTTP server 212 has blockchain clients 216 for each of the participating blockchain networks 220, 222, 224.

A separate blockchain network 218 may be used for user identity and access management. The identity information of each user may be maintained on a separate blockchain network. An identity verification and certification procedure is performed for securely linking blockchain accounts to real users. The identity (and associated blockchain accounts) of each user may be separately verified through an identity verification process. A system and associated methods for securely linking blockchain accounts to real users, as described in related U.S. patent application Ser. No. 15/863, 128 titled Method and System for Blockchain-Based Combined Identity, Ownership and Custody Management filed Jan. 5, 2018, the content of which is incorporated herein by reference except to the extent disclosure therein is inconsistent with disclosure herein. A user identity registration and certification procedure is performed that comprises receiving hashed user identification information that has been signed with a private key of the user from the user, defining a seal contract, generating an address of the seal contract, defined as a sealed user record address, and providing the sealed user record address. The procedure may further comprise receiving a hashed verification record from a certificate authority, generating an address of a verification contract from the hashed verification record, defined as a sealed verification record address and providing the sealed verification record address. Furthermore, the procedure may further comprise generating a certification contract from a combination of the sealed user record address, a certification token, and the sealed verification record address, providing a certification contract address, receiving a verification record by a certification authority comprising the hashed user identification information and a token, and receiving a combination of the certification contract address and the seal contract, defining a received certification contract address and a received seal contract, respectively. Additionally, the procedure may further comprise obtaining each of the sealed user record address and the sealed verification record address from the certification contract address, retrieving the seal contract from the sealed user record address, defining a retrieved seal contract, decrypting the retrieved seal contract using a public key associated with the user, defining a decrypted retrieved seal contract, and comparing the decrypted retrieved seal contract and the received seal contract. Yet further, the procedure may comprise retrieving the verification contract from the sealed verification record address, defining a retrieved verification contract, obtaining a certification token from the certification contract address, generating a hashed confirming verification record by hashing the combination of the decrypted retrieved seal contract and the certification token, and comparing the hashed confirming verification record to the retrieved verification contract. Upon a comparison of the decrypted retrieved seal contract and the received seal contract indicating they are at least a partial match and the comparison of the hashed confirming verification record to the retrieved verification contract indicating they are at least a partial match, a session certification token for a decentralized application may be generated. Finally, the procedure may comprise transmitting the session certification token to the user.

Figure 4:
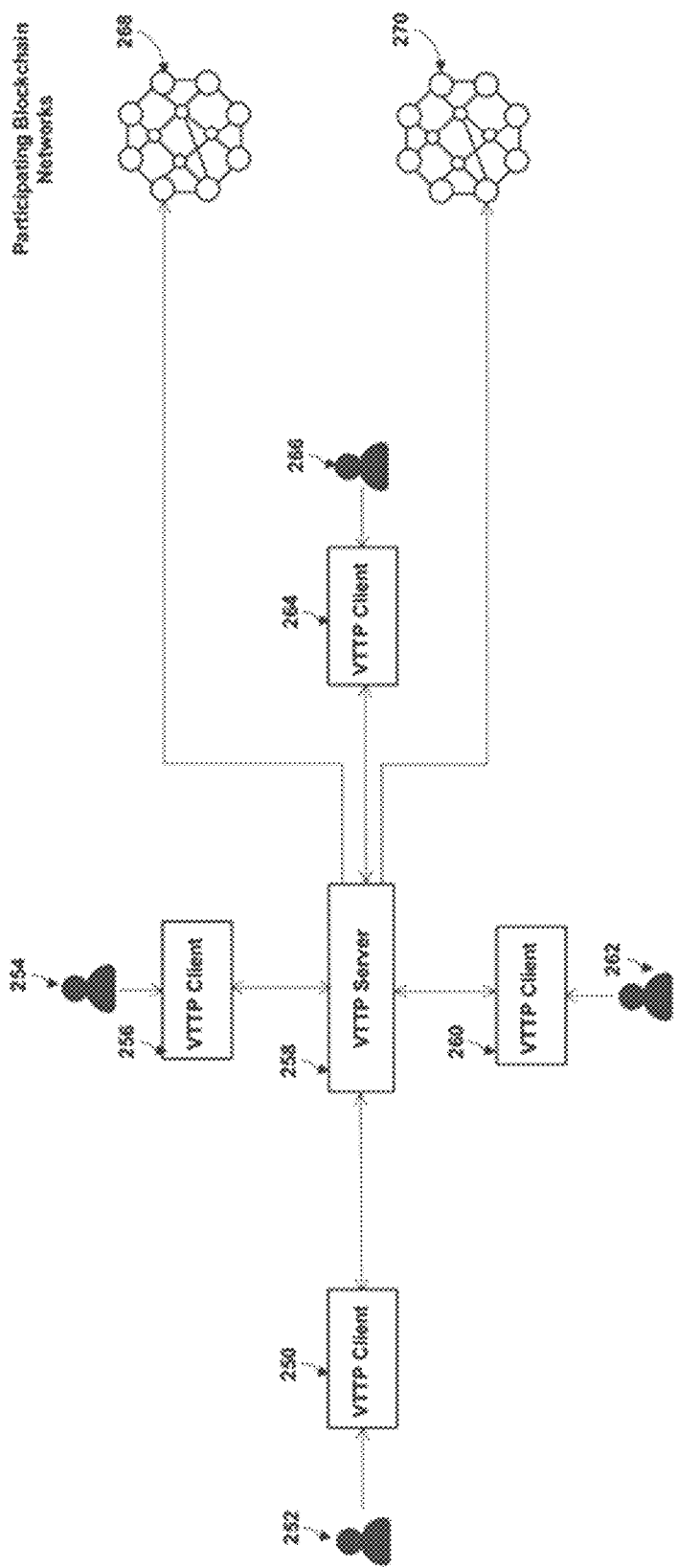
FIG. 4 is an illustration of the VTTP client-server model, according to an embodiment of the invention.

Referring now to FIG. 4, the VTTP client-server model, is described in more detail. In the client-server model, VTTP works as a request-response protocol based on a client-server architecture, where VTTP clients 250, 256, 260, 264 send requests to a VTTP server 258, and the server responds to the requests. The server processes the VTTP requests and generates and sends transactions to the participating blockchain networks 268, 270 to execute a value transfer.

Figure 5:
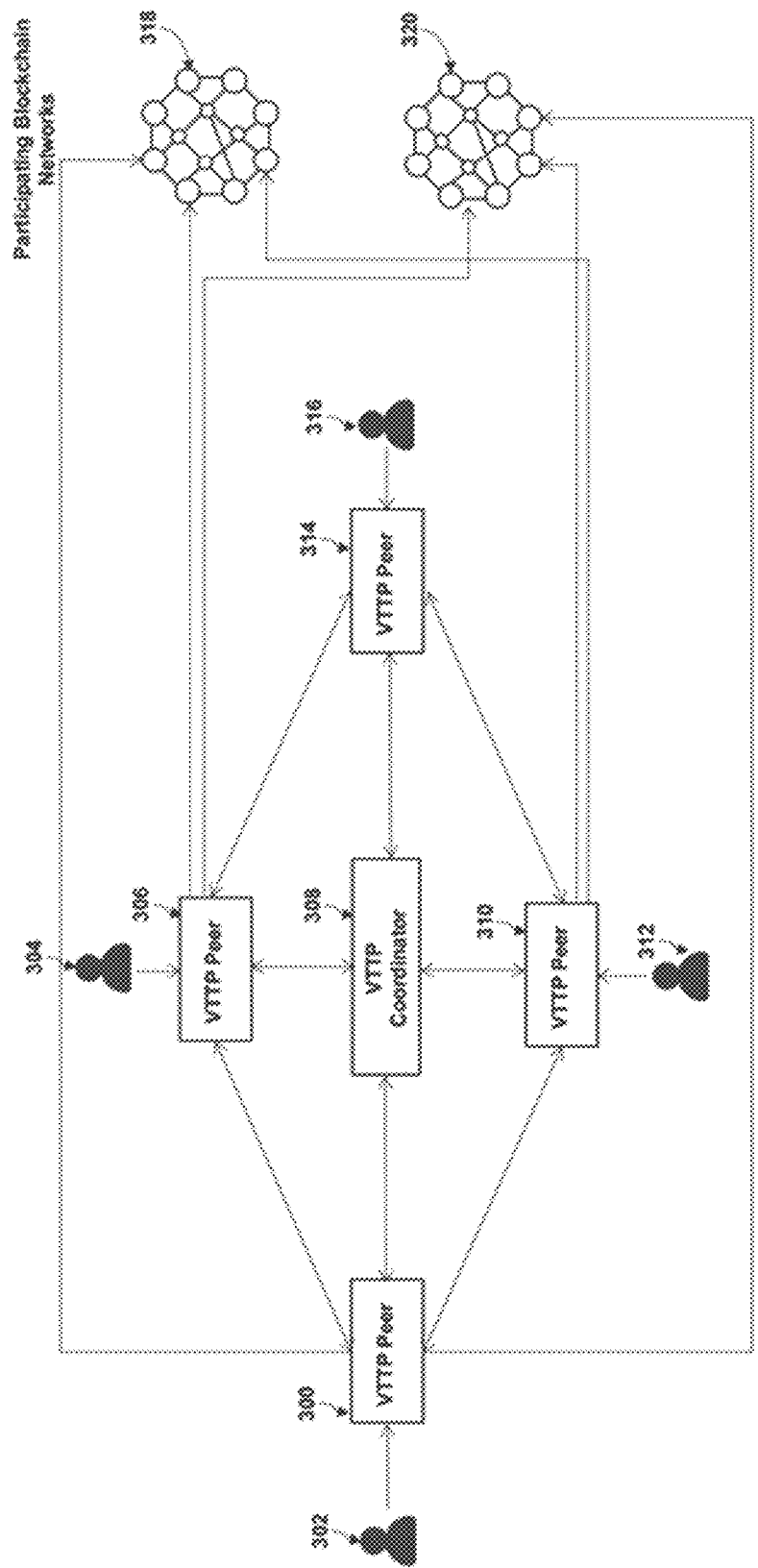
FIG. 5 is an illustration the VTTP peer-to-peer model, according to an embodiment of the invention.

Referring now to FIG. 5, the VTTP peer-to-peer model, is described in more detail. In the peer-to-peer model, VTTP works as a peer-to-peer protocol where VTTP peers 300, 306, 310, 314, operated by respective users 302, 304, 312, 316, communicate directly with their peers and a VTTP coordinator 308 may be used for coordinating the communication between peers. VTTP peers 300, 306, 310, 314 generate and send transactions to the participating blockchain networks 268, 270 to execute a value transfer on blockchain networks 318, 320.

Figure 6:
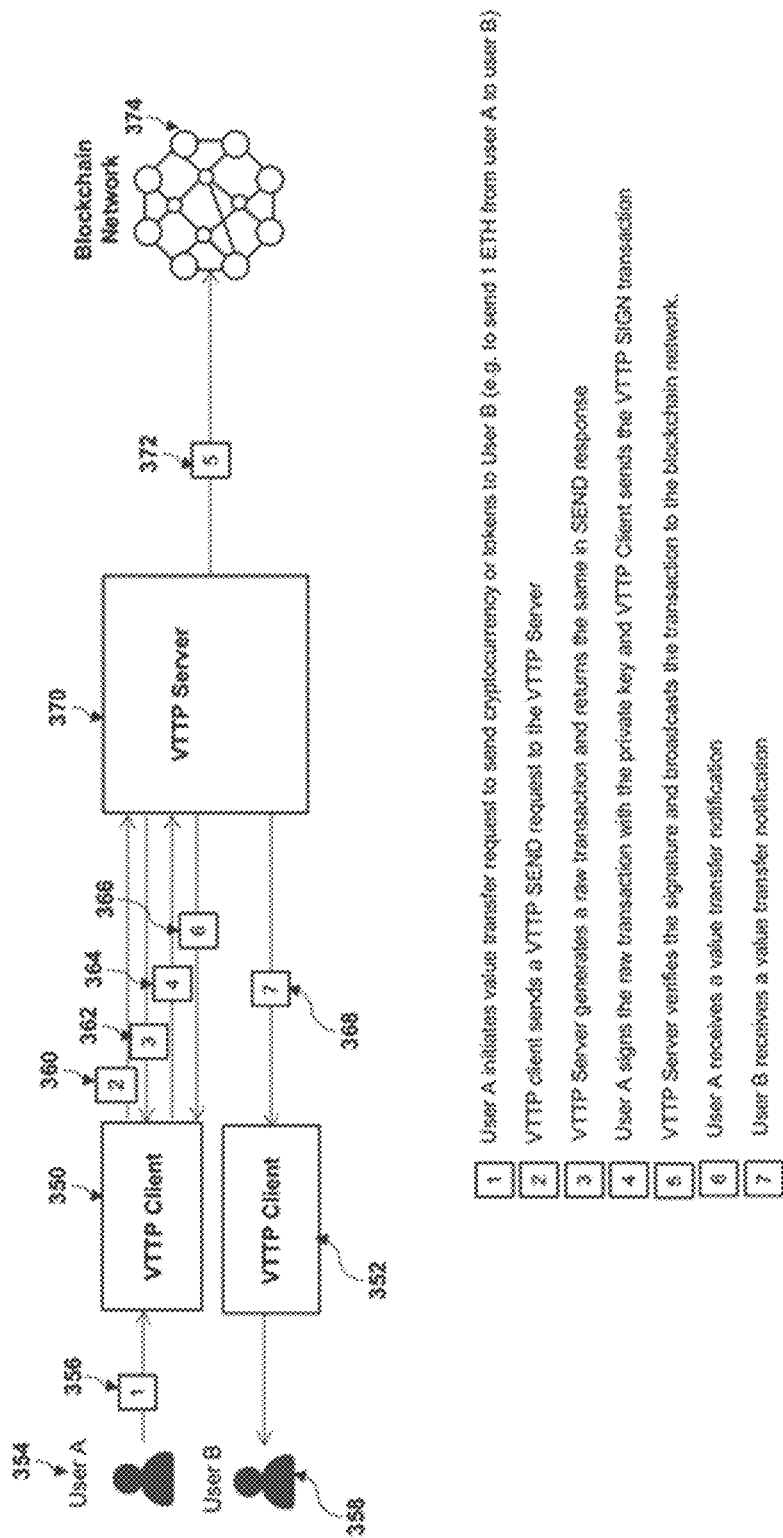
FIG. 6 is an illustration of the VTTP intra-chain value transfer process, according to an embodiment of the invention.

Referring now to FIG. 6, the VTTP intra-chain value transfer process, is described in more detail. The VTTP intra-chain value transfer process enables transfer of cryptocurrency or tokens from one account to another account on the same blockchain network. For example, consider an intra-chain value transfer request where a User A 354 wants to transfer certain units of a cryptocurrency or tokens from an account on a blockchain network 374 to the account of another User B 358 on the same blockchain network. At step 1 356, User A 354 initiates value transfer request to send cryptocurrency or tokens to User B 358 (e.g. to send 1 ETH from user A to user B). At step 2 360, the VTTP client 350 sends a VTTP SEND request to the VTTP server 370. At step 3 362, the VTTP server generates a raw transaction and returns the same in SEND response. At step 4 364, User A signs the raw transaction with the private key and VTTP client 350 sends the VTTP SIGN transaction. At step 5 372, VTTP server 370 verifies the signature and broadcasts the transaction to the blockchain network 374. At step 6 366, User A 354 receives a value transfer notification. At step 7 368, User B 358 receives a value transfer notification via VTTP Client 352.

Figure 7:
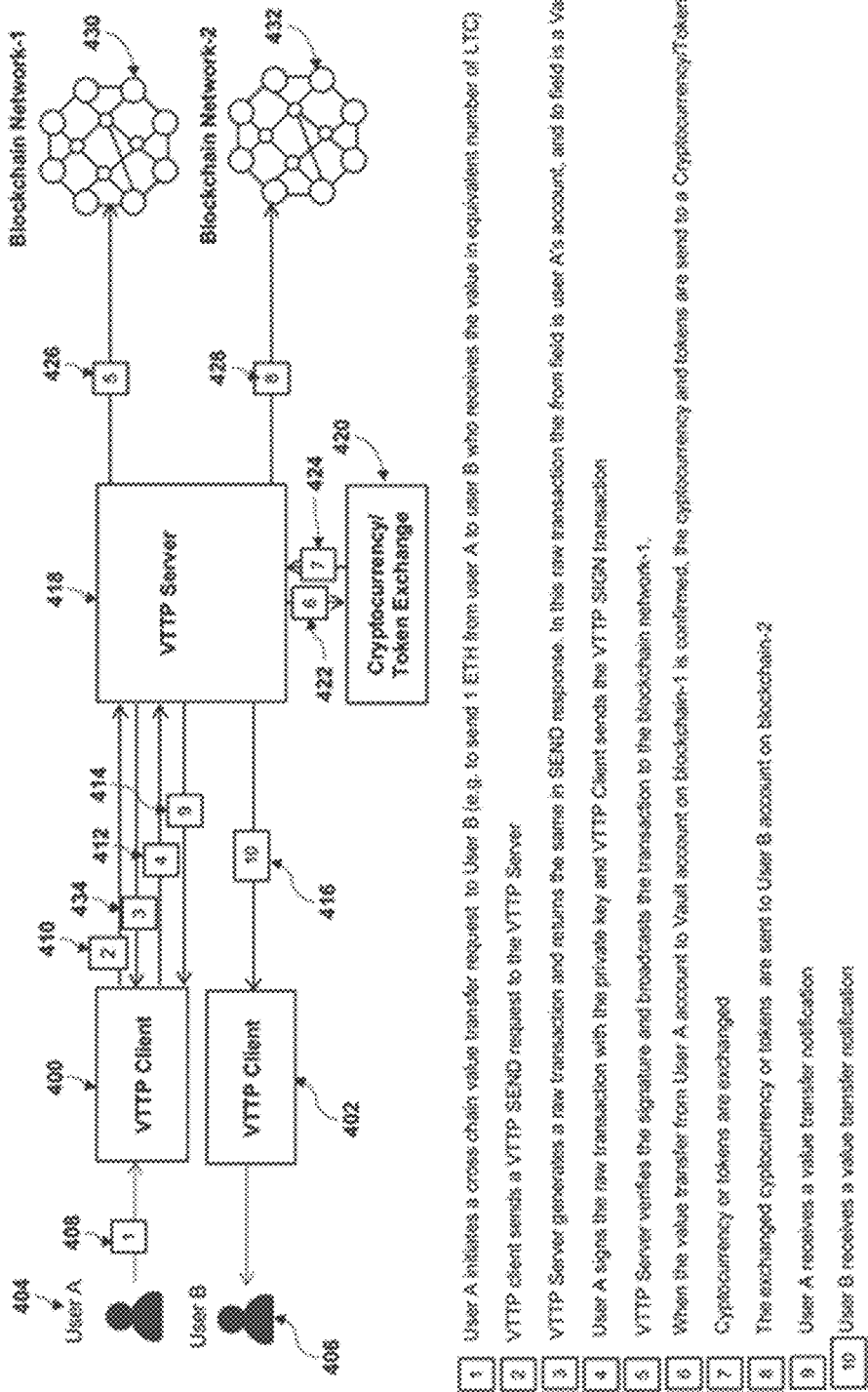
FIG. 7 is an illustration of the VTTP inter-chain value transfer process, according to an embodiment of the invention.

Referring now to FIG. 7, the VTTP inter-chain value transfer process, is described in more detail. The VTTP inter-chain value transfer process enables transfer of cryptocurrency or tokens from an account on a blockchain network to another account on a different blockchain network. At step 1 408, User A 404 initiates a cross chain value transfer request to User B 406 (e.g. to send 1 ETH from user A to user B who receives the value in equivalent number of LTC). At step 2 410, VTTP client 400 sends a VTTP SEND request to the VTTP server 418. At step 3 434, VTTP server generates a raw transaction and returns the same in SEND response. In this raw transaction the 'from' field is user A's account, and 'to' field is a 'Vault Account' on blockchain network-1 430. At step 4 412, User A 404 signs the raw transaction with the private key and VTTP client 400 sends the VTTP SIGN transaction. At step 5 426, VTTP server 418 verifies the signature and broadcasts the transaction to the blockchain network-1 430. At step 6 422, when the value transfer from User A account to Vault account on blockchain network-1 430 is confirmed, the cryptocurrency and tokens are sent to a Cryptocurrency/Token Exchange account 420. At step 7 424, cyptocurrency or tokens are exchanged. At step 8 428, the exchanged cyptocurrency or tokens are sent to User B account on blockchain network-2 432. At step 9 414, User A 404 receives a value transfer notification. At step 10 416, User B 406 receives a value transfer notification via VTTP Client 402.

Referring now to FIG. 8, VTTP commands are described in more detail. The VTTP GET command 452 is used to retrieve information about an account, contract, transaction, and an exchange rate for a token. For example, the VTTP GET command 452 to retrieve balance of an account may look as follows:

GET vttp://ROOT_URL/ethereum/address/0x004E1A8-B6d1B65C2497055e65AFC5E5A46Db750D/balance The VTTP SEND command 454 is used to send value from one account to another account in same network. For example, the VTTP SEND command 454 to send ETH from one Ethereum account to another may look as follows:

SEND vttp://ROOT_URL/ethereum?from=0x004E1A8-B6d1B65C2497055e65AFC5E5A46Db750D &to=0x0049-b1258Fd75C021d99E2109323Daa0E9ae8a6A&value=1

A VTTP SEND command 454 to send ERC20 token ABC from account A and receive ERC20 token XYZ in account B may look as follows:

SEND vttp://ROOT_URL/ethereum?from=0x004E1A-8B6d1B65C2497055e65AFC5E5A46Db750D &to=0x004-9b1258Fd75C021d99E2109323Daa0E9ae8a6A &source= ABC&destination=XYZ& &sourceContract=0x4891B1-5e2942FD4c176E4f2Ae3faF281E26EE466 &destinationContract=0x2fF2159D77805d489F6347Bb-Ea3067Efb13d3176&value=1

The VTTP XSEND command 456 is used to send value from one account to another account in another network. For example, the VTTP XSEND command 456 to send ETH from an Ethereum account and receive LTC in a Litecoin account may look as follows:

XSEND vttp://ROOT_URL/ethereum/litecoin?from= 0x004E1A8B6d1B65C2497055e65AFC5E5A46Db750D& to=LWhC2FmafKgDbqT129rB8Yj3dB9FVGhA2E& source=ETH&destination=LTCvalue=1

The VTTP REQUEST command 458 is used to request value from an account in the same network. For example, the VTTP REQUEST command 458 to request ETH from an Ethereum account may look as follows:

REQUEST vttp://ROOT_URL/ethereum?from =0x004-E1A8B6d1B65C2497055e65AFC5E5A46Db750D &to= 0x0049b1258Fd75C021d99E2109323Daa0E9ae8a6A& value=1

The VTTP XREQUEST command 460 is used to request value from an account in another network. For example, the VTTP XREQUEST command 460 to request LTC from a Litecoin account and receive ETH in Ethereum account may look as follows:

XREQUEST vttp://ROOT_URL/ethereum/litecoin?from =0x004E1A8B6d1B65C2497055e65AFC5E5A-46Db750D&to=LWhC2FmafKgDbqT129rB8Yj3dB9-FVGhA2E &source=LTC&destination=ETH&value=1

The VTTP RESPOND command 462 is used to accept or deny a request received from an account in the same network. For example, the VTTP RESPOND command 462 to accept a value transfer request within Ethereum network may look as follows:
 RESPOND vttp://ROOT_URL/ethereum?reqid=1323-76876 &status=accept Similarly, the VTTP RESPOND command 462 to deny a value transfer request within Ethereum network may look as follows:
 RESPOND vttp://ROOT_URL/ethereum?reqid=132-376876 &status=deny The VTTP XRESPOND command 464 is used to accept or deny a request received from an account in another network. For example, the VTTP XRESPOND command 464 to accept a value transfer request from Litecoin to Ethereum network may look as follows:
 XRESPOND vttp://ROOT_URL/ethereum/litecoin?reqid=63768237 &status=accept Similarly, the VTTP XRESPOND command 464 to deny a value transfer request from Litecoin to Ethereum network may look as follows:
 XRESPOND vttp://ROOT_URL/ethereum/litecoin?reqid=63768237 &status=deny The VTTP SIGN command 466 is used to sign and approve a transaction. For example, the VTTP SIGN command 466 to sign a value transfer request may look as follows:
 SIGN vttp://ROOT_URL/ethereum?Id=1827637&signature=0xf86b0184ee6b280082520894187

Figure 9:
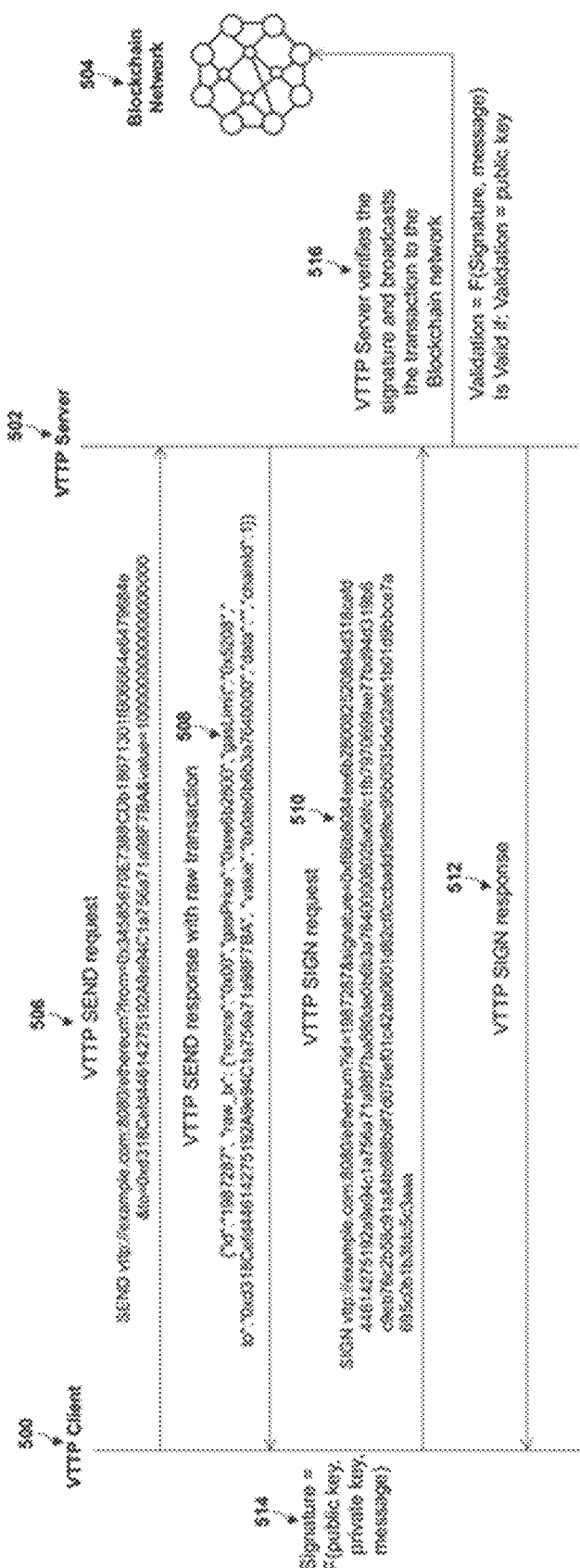
FIG. 9 is an illustration the transaction signing process in VTTP, according to an embodiment of the invention.

Referring now to FIG. 9, the transaction signing process in VTTP, is described in more detail. VTTP transactions that transfer value are signed and approved by the user on the client side. For example, to send value from one account to another account within the same blockchain network 504, the VTTP client 500 sends a VTTP SEND command at step 506. The VTTP server 502 generates the blockchain network 504 specific raw transaction and returns the raw transaction in the response at step 508. The user then signs the raw transaction with the private key 514 and sends the signed transaction with the VTTP SIGN command at step 510. The VTTP server 502 verifies the signature, broadcasts the signed transaction at step 516 to the blockchain network 504, and sends a SIGN response at step 512. With this model of signing transactions on the client side, the user can retain the private keys on the user's local machine and need not share them with the VTTP server.

Figure 10:
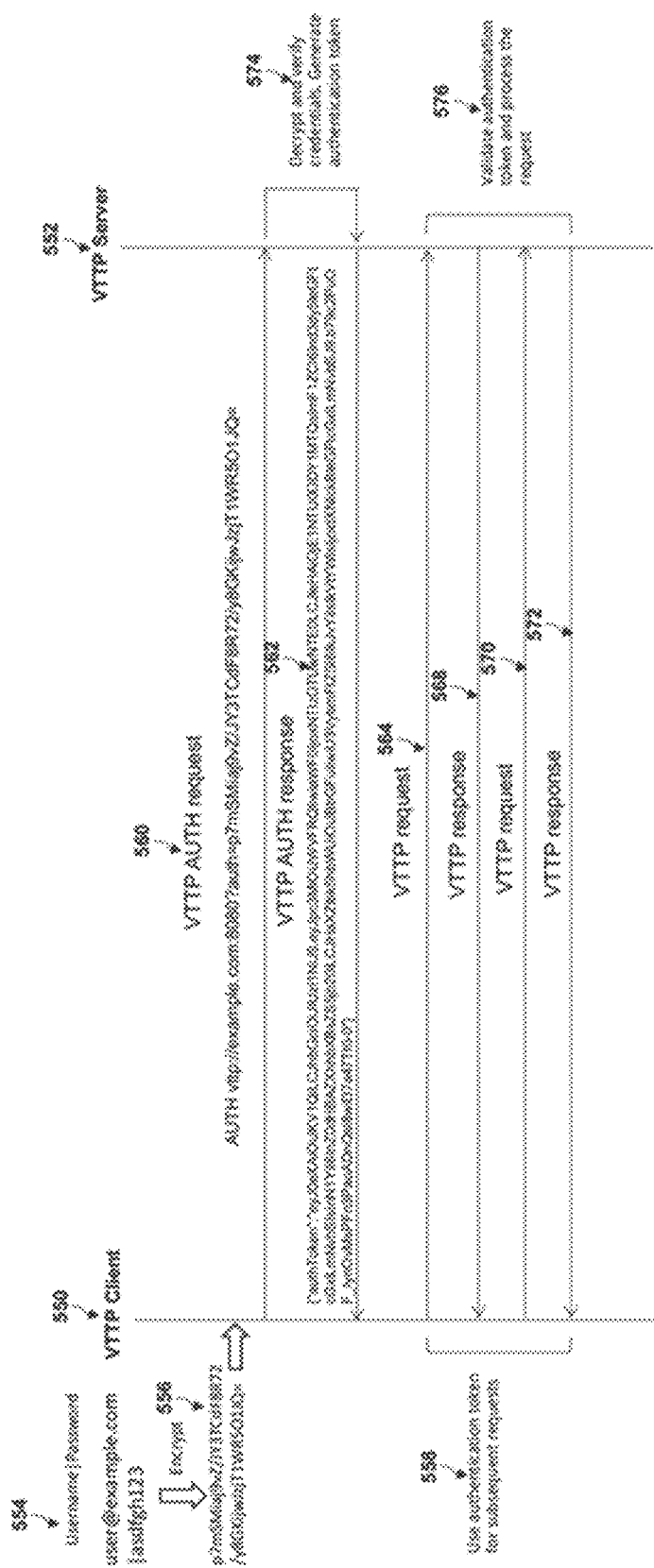
FIG. 10 is an illustration of the token-based authentication process in VTTP, according to an embodiment of the invention.

Referring now to FIG. 10, the token-based authentication process in VTTP, is described in more detail. A VTTP client 550 can authenticate with a VTTP server 552 using an authentication token which is generated by the client and verified by the VTTP server 552. VTTP may use existing authentication token standards such as JSON Web Token (JWT) (described in RFC 7519) for securely transmitting information between a client and server as a JSON object. VTTP may also support other custom token standards. An example of using JSON Web Token standard for authenticating a VTTP client 550 with a VTTP server 552 is shown in FIG. 10. At the client side, the username and password fields 554 are combined and encrypted to generate an encrypted authentication string 556. The VTTP client 550 sends a VTTP AUTH request to the VTTP server 552 containing the encrypted authentication string 556 at step 560. The VTTP server decrypts the encrypted authentication string 556 and verifies the user's credentials, and then generates a JSON Web token at step 574. A JSON Web Token contains header, payload and signature fields. The header field may specify the token type (JWT) and the signing algorithm used (such as HMAC SHA-256 algorithm). The payload field may contain registered, private and public claims. The registered claims defined in JWT include claims such as 'iss' (issuer of the token), 'sub' (subject of the token), 'aud' (audience of the token), 'exp' (token expiration time defined in Unix time), 'nbf' ('not before time' that identifies the time before which the JWT must not be accepted for processing), 'iat' ('issued at' time, in Unix time, at which the token was issued) and 'jti' (JWT ID). To create the signature part of a JSON Web Token the encoded header, the encoded payload, a secret, are signed using the algorithm specified in the header. For example, if the HMAC SHA256 algorithm is used, the signature is created as follows:

```
HMACSHA256(
base64UrlEncode(header) + "." +
base64UrlEncode(payload),
secret)
```

The signature is also used to verify the message wasn't changed along the way. The VTTP server 552 returns a VTTP AUTH response 562 containing the JSON Web Token. The VTTP client 550 uses this token for all subsequent VTTP requests 564, 570, and the VTTP server 552 validates the authentication token and process the VTTP requests 564, 570, then sending respective VTTP response 568, 572. When the JSON Web token expires, the VTTP client 550 sends a new AUTH request.

Figure 11:
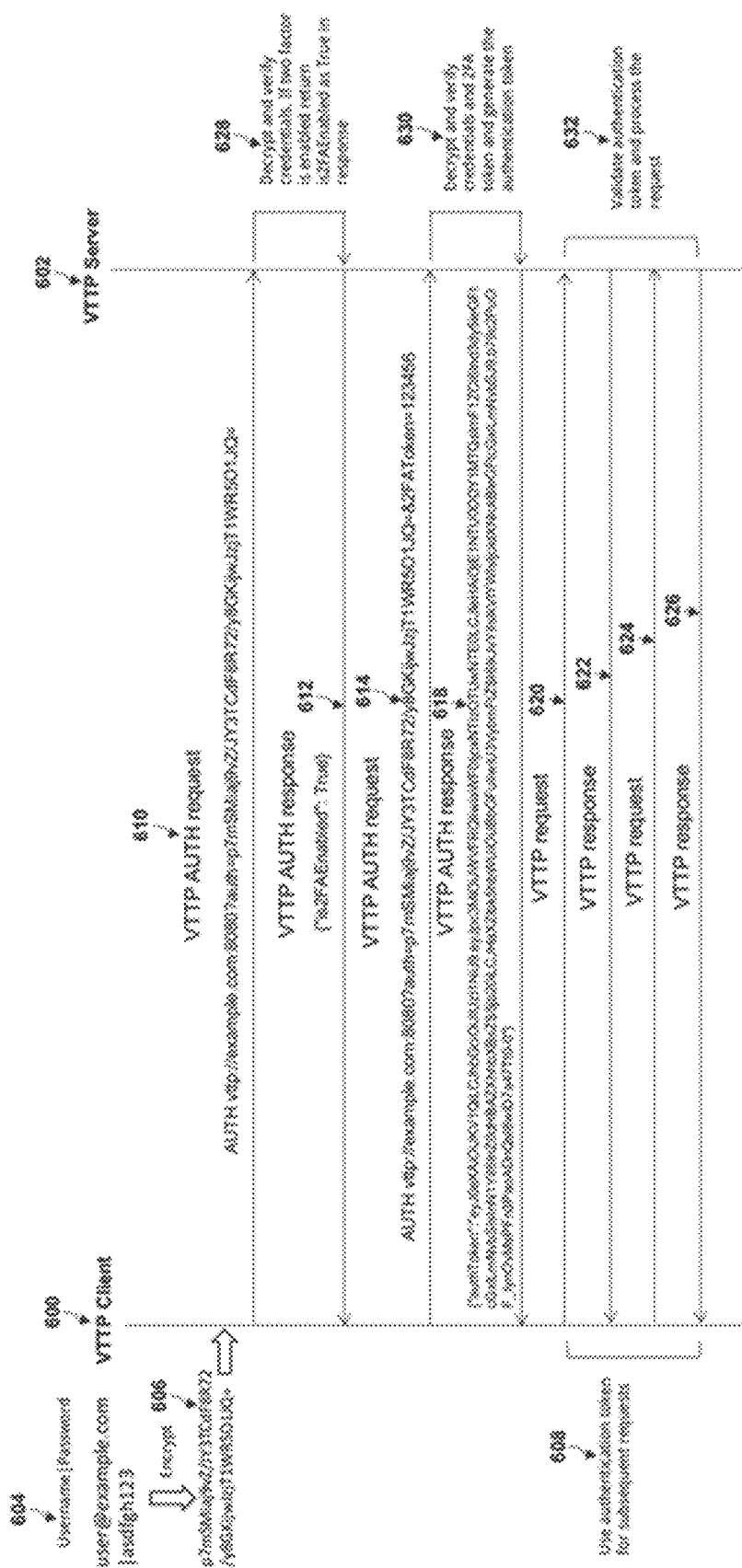
FIG. 11 is an illustration of the two-factor authentication process in VTTP, according to an embodiment of the invention.

Referring now to FIG. 11, the two-factor authentication process in VTTP, is described in more detail. VTTP supports two-factor authentication. To authenticate a VTTP client 600 with a VTTP server 602 when two-factor authentication is enabled for a user's account, the client first sends a VTTP AUTH request 610 containing an encrypted authentication string. The VTTP server 602 decrypts the authentication string and verifies the user's credentials at step 628. If two-factor is enabled for user's account, the VTTP server 602 returns 'is2FAEnabled' as 'True' in the response 612. The VTTP client 600 then sends another AUTH request 614, containing the encrypted authentication string and a two-factor authentication token. The VTTP server 602 decrypts and verifies user's credentials and two-factor authentication token and generates JSON Web Token which is used as an authentication token for all subsequent requests sent by the VTTP client 600 at step 630. The VTTP server 602 returns a VTTP AUTH response containing the JSON Web Token at step 618. The VTTP client 600 uses this token for all subsequent VTTP requests 620, 624, and the VTTP server 602 validates the authentication token and process the VTTP requests 620, 624, then sending respective VTTP response 622, 626.

Figure 12:
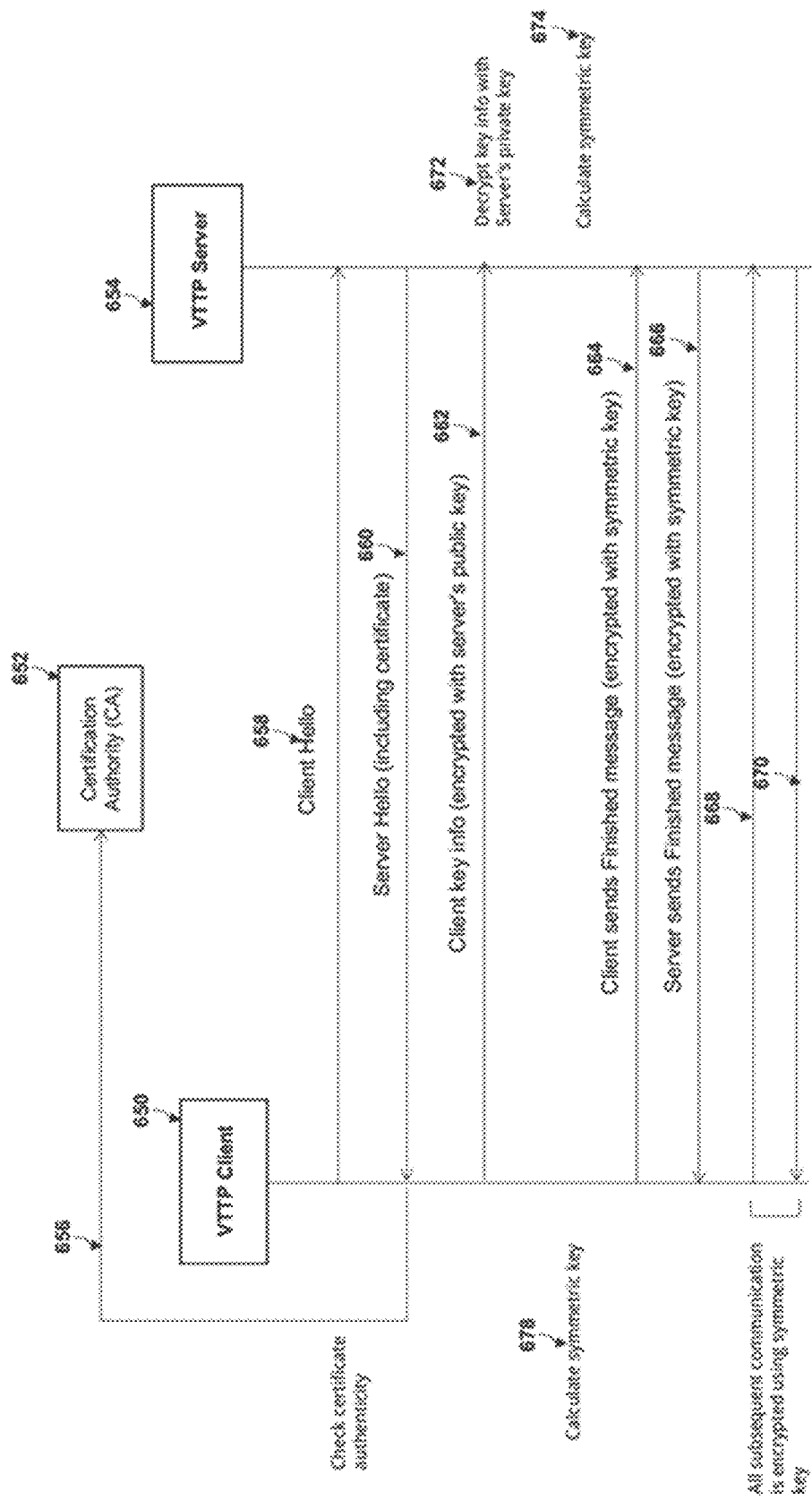
FIG. 12 is an illustration of VTTP Secure (VTTPS), a secure version of VTTP that runs over SSL/TLS, according to an embodiment of the invention.

Referring now to FIG. 12, VTTP Secure (VTTPS), a secure version of VTTP that runs over SSL/TLS, is described in more detail. The use of SSL/TLS allows an encrypted channel of communication between the client and server. A handshake process is done in which the client and server compute a symmetric key which is used to encrypt all communication during their TLS session. At step 658, a VTTP client 650 initiates a handshake by sending a Client Hello message to a VTTP server 654. At step 660, the VTTP server 654 responds with a Server Hello message and the server's certificate. At step 656, the VTTP client 650 authenticates the server's identity by verifying the server certificate with a certificate authority 652. At step 662, the VTTP client 650 sends a key-info containing a random string of data to the server (which is encrypted with the server's public key). After this step the VTTP client 650 and the VTTP server 654 each have the random string of data which is used to calculate (independently) the symmetric key that will be used to encrypt all remaining communication for the duration of that specific TLS session, such calculations being performed at steps 678 and 674, respectively. The VTTP client 650 and the VTTP server 654 then both send respective "Finished' messages that have been encrypted with the symmetric key at the end of the handshake at steps 664 and 666. All subsequent communication 668, 670 between the VTTP client 650 and the VTTP server 654 may be encrypted using the symmetric key.

Figure 13:
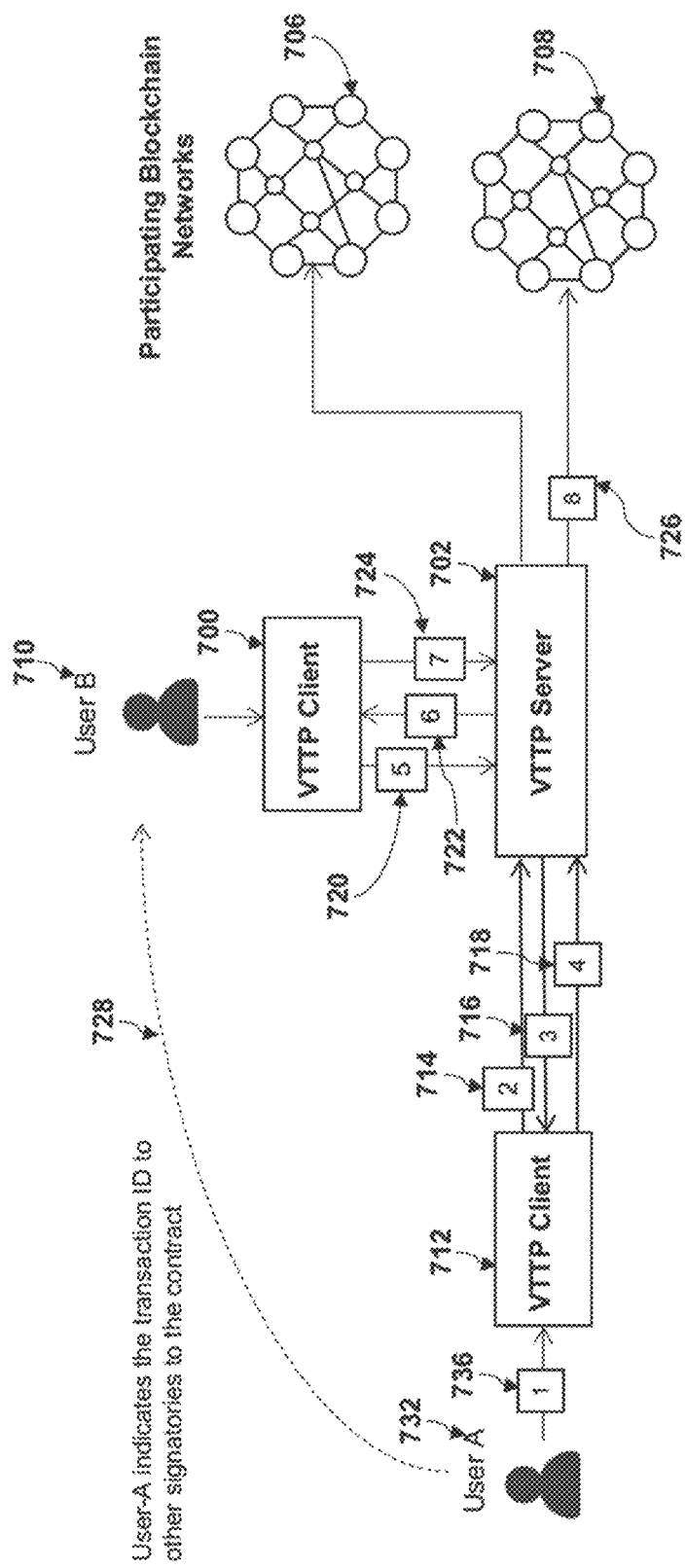
FIG. 13 is an illustration the multi-signature transaction signing process in VTTP, according to an embodiment of the invention.

Referring now to FIG. 13, the multi-signature ("multisig") transaction signing process in VTTP, is described in more detail. The FIG. 13 shows an example of using VTTP for a multisig contract that requires 2 out of 3 signatures to process a transaction. At step 1 736, User A 732 initiates value transfer request to send cryptocurrency or tokens. At step 2 714, VTTP client 712 sends a VTTP SEND request to the VTTP server 702. At step 3 716, VTTP server 702 generates a raw transaction and returns the same in SEND response. At step 4 718, User A 732 signs the raw transaction with the private key and VTTP client 712 sends the VTTP SIGN transaction. At step 728, User A 732 may indicate the transaction ID to other signatories to the contract or other signatories may get a notification from the VTTP server 702. At step 5 720, User B 710 retrieves the transaction using the transaction ID. At step 6 722, VTTP server 702 returns the raw transaction to be signed by User B 710. At step 7 724, User B 710 signs the raw transaction with the private key and VTTP client 700 sends the VTTP SIGN transaction. At step 8 726, VTTP server 702 verifies the signatures of User A 732 and User B 710 and broadcasts the transaction to a blockchain network 708.

Figure 14:
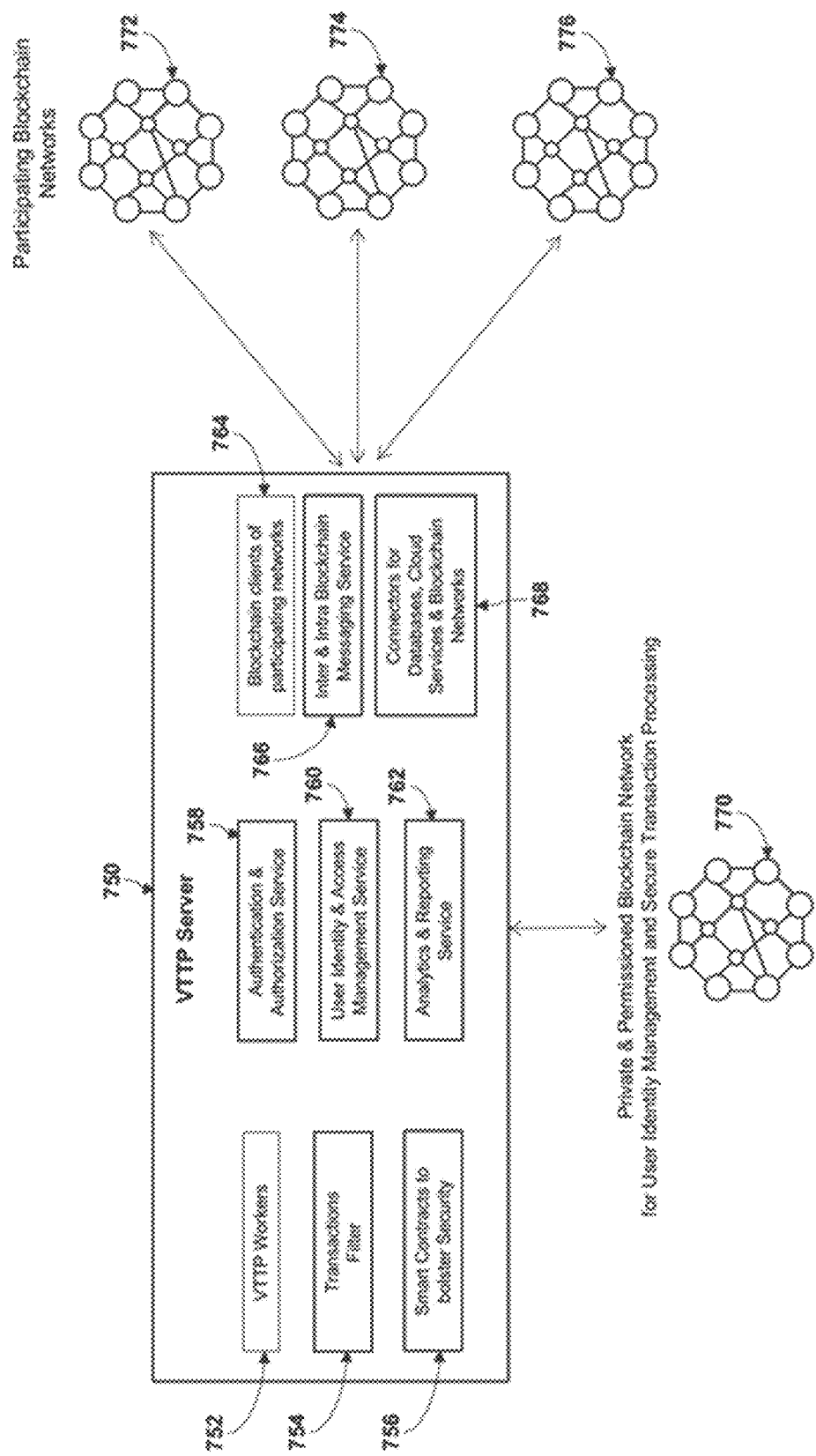
FIG. 14 is an illustration an exemplary VTTP server architecture, according to an embodiment of the invention.

Referring now to FIG. 14, an exemplary VTTP server architecture, is described in more detail. A VTTP server 750 may have one or more VTTP Workers 752 to process VTTP requests and execute the VTTP commands sent by VTTP clients. VTTP server 750 has blockchain clients 764 for each of the participating blockchain networks 772, 774, 776. A separate blockchain network 770 may be used for user identity and access management. The VTTP server 750 may contain additional services, such as User Identity & Access Management Service 760, Authentication & Authorization Service 758, and Analytics & Reporting Service 762. The VTTP server 750 may contain inter- and intra-blockchain messaging services 766 and connectors for databases, cloud services & blockchain networks 768. A transactions filter 754 may be used in the server to filter transactions. The server may use various Smart Contracts 756 to bolster security. These smart contracts may be executed for each VTTP request and perform additional verification (such as verifying sender and receiver's address). The smart contracts may enforce checks such as time limits or quantity restrictions. Some smart contracts may perform functions similar to virus filters, for filtering out suspicious transactions. New smart contracts can be distributed to VTTP servers in a manner similar to virus updates.

Figure 15:
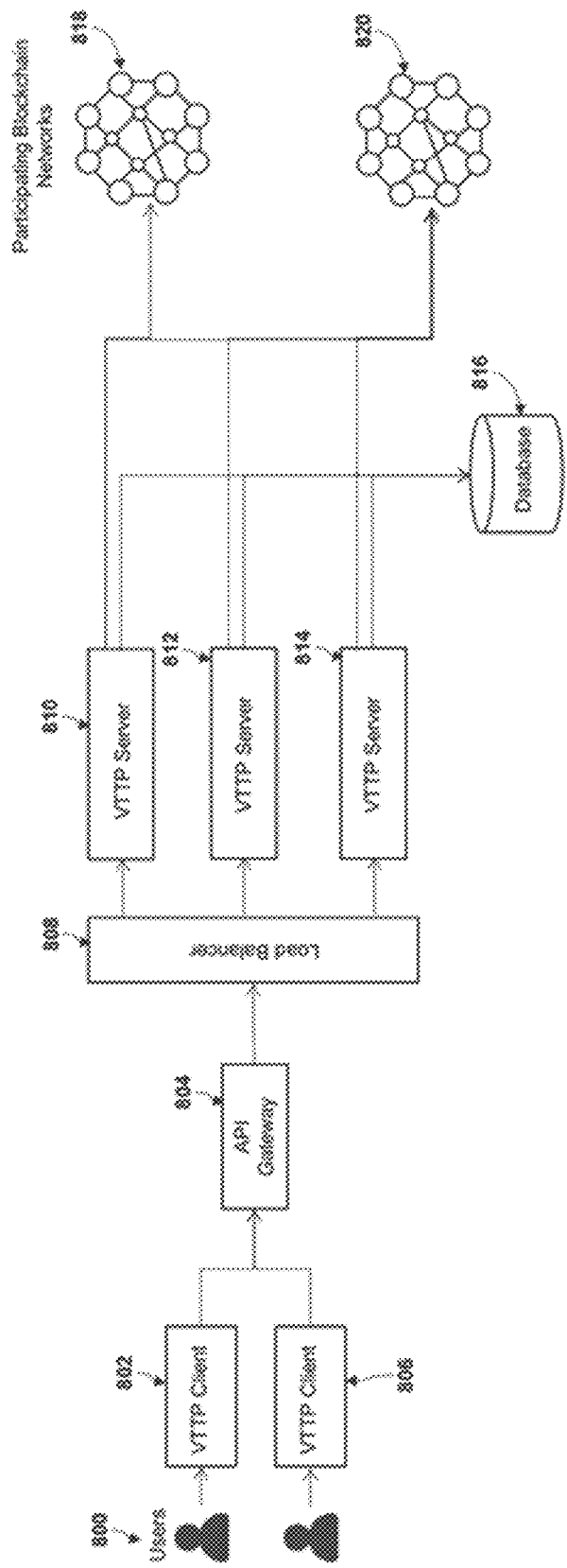
FIG. 15 is an illustration an exemplary VTTP reference architecture, according to an embodiment of the invention.

Referring now to FIG. 15, an exemplary VTTP reference architecture, is described in more detail. Users 800 may use VTTP clients 802, 806 to communicate with VTTP servers 810, 812, 814 through an API gateway 804. The VTTP servers 810, 812, 814 sit under a load balancer 808 and expose a number API endpoints. The API gateway 804 makes these APIs available to the VTTP clients. Each API has an endpoint (for example, vttp://example.com/ethereum) and a set of VTTP methods or commands which are supported for the endpoint (such as GET, SEND, REQUEST, etc.). The API gateway 804 may use an API key to enable authentication for APIs. The API gateway 804 may also perform additional functions such as logging each API request and rate-limiting of requests. A separate relational (SQL) or non-relational (NoSQL) database 816 may be used to store data such as user credentials and application specific data. Each VTTP server is connected to all the participating blockchain networks 818, 820.

Referring now to FIG. 16, VTTP status codes 850 are described in more detail. The status code '1xx' 852 is used to signal that a request has been received. For example, a value transfer request is received and is being processed. The status code '2xx' 854 is used to signal that a requested action has been successfully completed. The status code '3xx' 856 is used to signal that a VTTP command has been accepted, but the requested action is being held in abeyance, pending receipt of further information. The status code '4xx' 858 is used to signal that a VTTP command was not accepted due to a client error and the requested action did not take place. The status code '5xx' 860 is used to signal that a VTTP command was not accepted due to a server error and the requested action did not take place.

Figure 17:
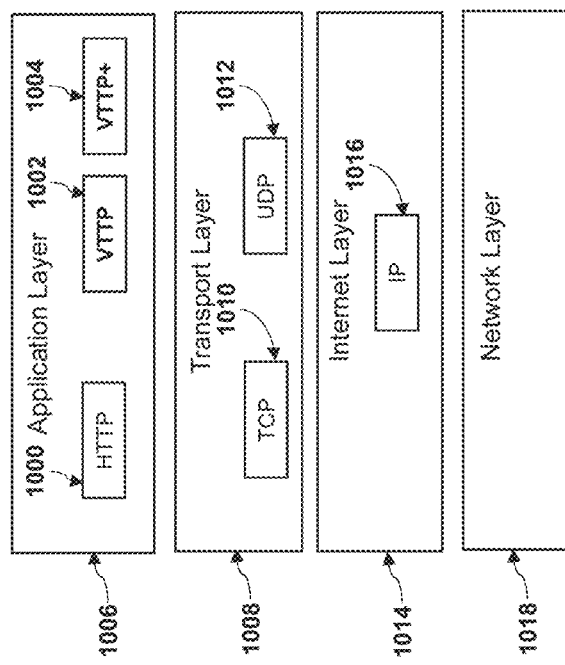
FIG. 17 is an illustration of the TCP/UDP/IP reference model layers with the VTTP+ protocol as part of the application layer, according to an embodiment of the invention.

A further embodiment of the invention may be referred to as a VTTP+ protocol. The VTTP+ protocol may be understood to build upon the VTTP protocol, including facilitating transactions from user devices, such as smart phones. Referring now to FIG. 17, TCP/IP reference model layers comprised by a VTTP+ protocol 1004 as part of an application layer 1006, is described in more detail. VTTP+ 1004 is an application layer protocol and works alongside Hypertext Transfer Protocol (HTTP) 1000 and VTTP protocol 1002 and on top of a transport layer 1008 executing TCP 1010 and UDP 1012 protocols, which are in turn on top of an Internet layer 1014 executing Internet Protocol (IP) 1016. While TCP and UDP are specifically recited, all other transport layer protocols as are known in the art are contemplated and included within the scope of the invention, including, but not limited to, SCTP (Stream Controlled Transfer Protocol), and Quick UDP Internet Connections (QUIC). Additionally, while VTTP+ may operate over the Internet, it is contemplated and included within the scope of the invention that VTTP+ may operate over any Wide Area Network (WAN), Local Area Network (LAN), Personal Area Network (PAN), cellular network, and the like. Additionally, any communication medium is contemplated and included within the scope of the invention, including, but not limited to, Ethernet, fiber optical communication, cable communication, wireless communication (including radio, visible light, microwave, and any other electromagnetic transmission) such as IEEE 802.xx standards, and any other telecommunication standard, method, or medium. Moreover VTTP+ may be implemented on devices operating configured to communicate with other devices, i.e., the Internet of Things (IoT).

Figure 18:
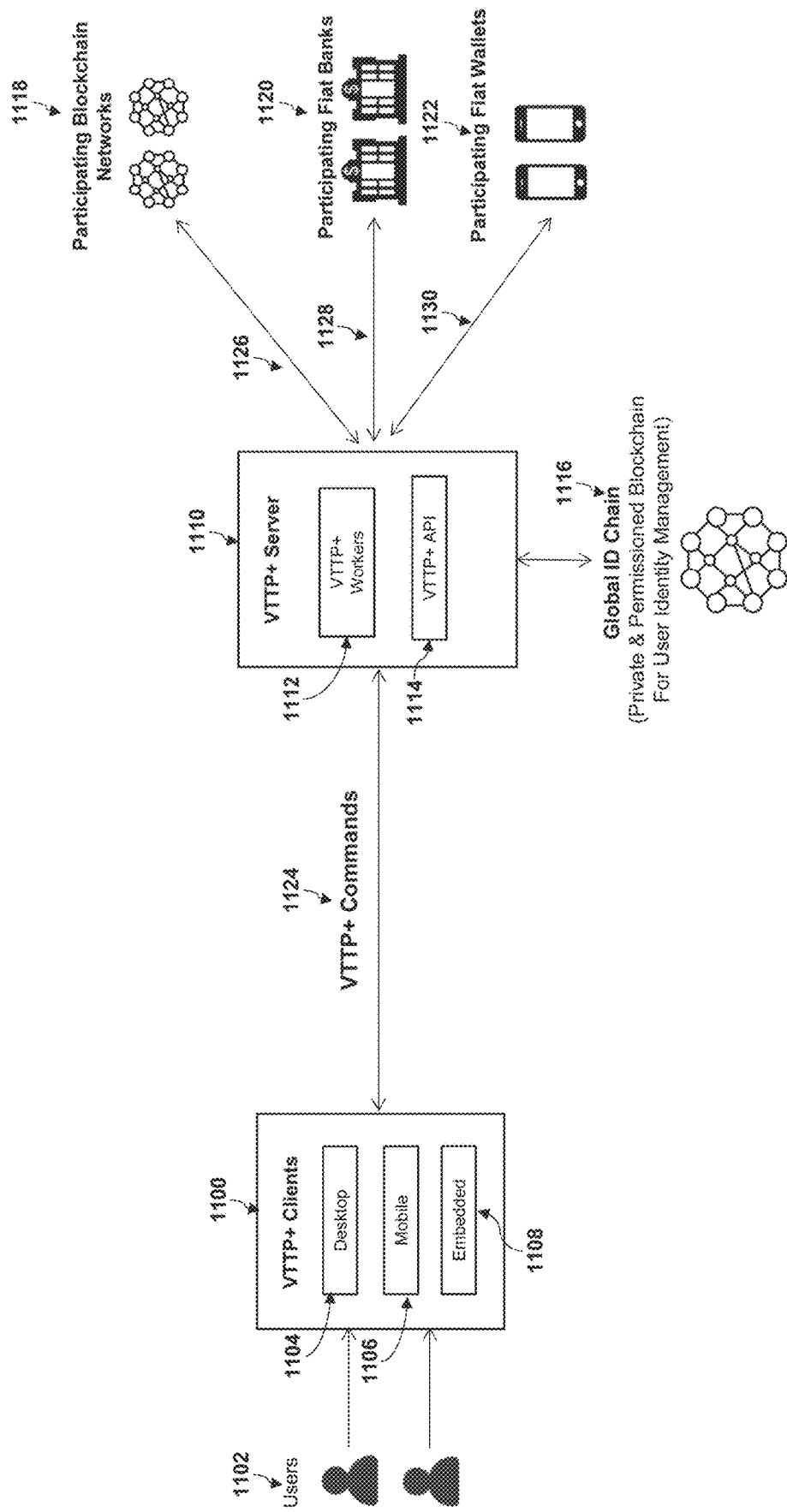
FIG. 18 is an illustration of the VTTP+ components, according to an embodiment of the invention.

Referring now to FIG. 18, components of the VTTP+ protocol are described in more detail. In the current embodiment, VTTP+ works as a request-response protocol based on a client-server architecture, where a VTTP+ client 1100 sends requests to a VTTP+ Server 1110, and the server 1110 responds to the requests. The VTTP+ clients 1100 may be available for different platforms and devices such as a desktop client 1104, a mobile client 1106 or an embedded client 1108. Users 1102 send VTTP+ requests to the VTTP+ server 1110 using VTTP+ clients 1100. VTTP+ requests contain VTTP+ commands 1124 which are processed by the VTTP+ server 1110. A VTTP+ server 1110 may have one or more VTTP+ Workers 1112 to process VTTP+ requests and execute the VTTP+ commands 1124 sent by VTTP+ clients 1100. The VTTP+ server 1110 may provide a VTTP+ API 1114 that allows the participating blockchain networks 1118, participating fiat banks 1120 and participating fiat wallets 1122 to use VTTP+ protocol for exchange of value 1126, 1128, 1130. The VTTP+ protocol supports the following types of transactions:

VTTP+ supports exchange of fiat currency (in fiat bank accounts and fiat wallet apps) with tokens on blockchain networks;

Fiat value transfer between fiat accounts of participating fiat banks;

Fiat value transfer between wallet accounts of participating fiat wallets;

Fiat value transfer between fiat accounts of participating fiat banks and accounts of participating fiat wallets;

VTTP+ allows retrieving information on accounts, balances, and transactions for all participating fiat bank accounts and fiat wallets; and VTTP+ allows retrieving information on accounts, balances, contracts, transactions for all participating blockchain networks.

A separate blockchain network 1116 may be used for user identity and access management. The identity information of each user may be maintained on a separate blockchain network. An identity verification and certification procedure is performed for securely linking blockchain accounts to real users. The identity (and associated blockchain accounts) of each user may be separately verified through an identity verification process. A system and associated methods for securely linking blockchain accounts to real users, as described in related U.S. patent application Ser. No. 15/863, 128 titled Method and System for Blockchain-Based Combined Identity, Ownership and Custody Management filed Jan. 5, 2018, the content of which is incorporated herein by reference except to the extent disclosure therein is inconsistent with disclosure herein. A user identity registration and certification procedure may be performed, comprising receiving hashed user identification information that has been signed with a private key of the user from the user, defining a seal contract, generating an address of the seal contract, defined as a sealed user record address, and providing the sealed user record address. The procedure may further comprise receiving a hashed verification record from a certificate authority, generating an address of a verification contract from the hashed verification record, defined as a sealed verification record address and providing the sealed verification record address. Furthermore, the procedure may further comprise generating a certification contract from a combination of the sealed user record address, a certification token, and the sealed verification record address, providing a certification contract address, receiving a verification record by a certification authority comprising the hashed user identification information and a token, and receiving a combination of the certification contract address and the seal contract, defining a received certification contract address and a received seal contract, respectively. Additionally, the procedure may further comprise obtaining each of the sealed user record address and the sealed verification record address from the certification contract address, retrieving the seal contract from the sealed user record address, defining a retrieved seal contract, decrypting the retrieved seal contract using a public key associated with the user, defining a decrypted retrieved seal contract, and comparing the decrypted retrieved seal contract and the received seal contract. Yet further, the procedure may comprise retrieving the verification contract from the sealed verification record address, defining a retrieved verification contract, obtaining a certification token from the certification contract address, generating a hashed confirming verification record by hashing the combination of the decrypted retrieved seal contract and the certification token, and comparing the hashed confirming verification record to the retrieved verification contract. Upon a comparison of the decrypted retrieved seal contract and the received seal contract indicating they are at least a partial match and the comparison of the hashed confirming verification record to the retrieved verification contract indicating they are at least a partial match, a session certification token for a decentralized application may be generated. Finally, the procedure may comprise transmitting the session certification token to the user.

Figure 19:
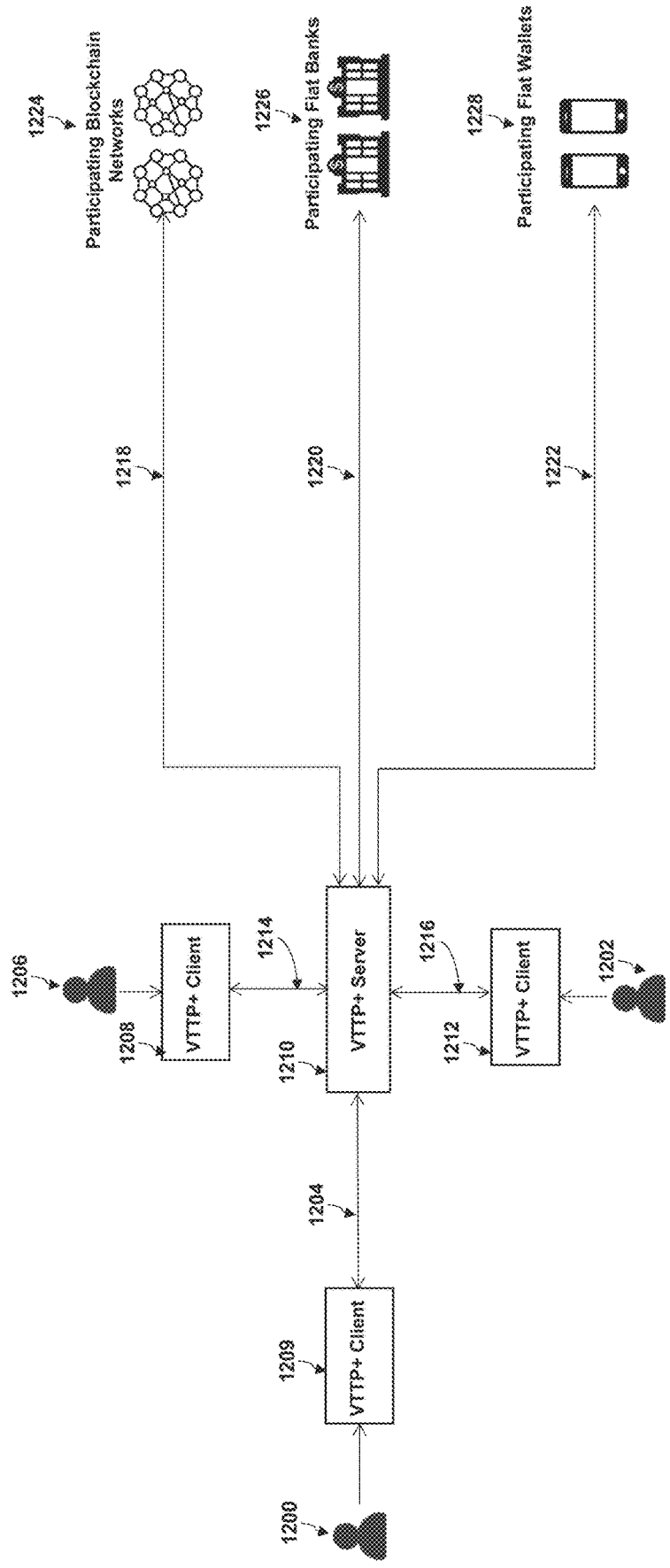
FIG. 19 is an illustration of a VTTP+ client-server model, according to an embodiment of the invention.

Referring now to FIG. 19, a VTTP+ client-server model is described in more detail. In the client-server model, VTTP+ works as a request-response protocol based on a client-server architecture, where users 1206, 1200, 1202 use VTTP+ clients 1208, 1209, 1212 to send requests 1214, 1204, 1216 to a VTTP+ server 1210, and the server 1210 responds to the requests. The server 1210 processes the VTTP+ requests 1214, 1204, 1216 and generates and sends transactions 1218, 1220, 1222 to participating blockchain networks 1224, participating fiat banks 1226 and participating fiat wallets 1228, to execute a value transfer.

Figure 20:
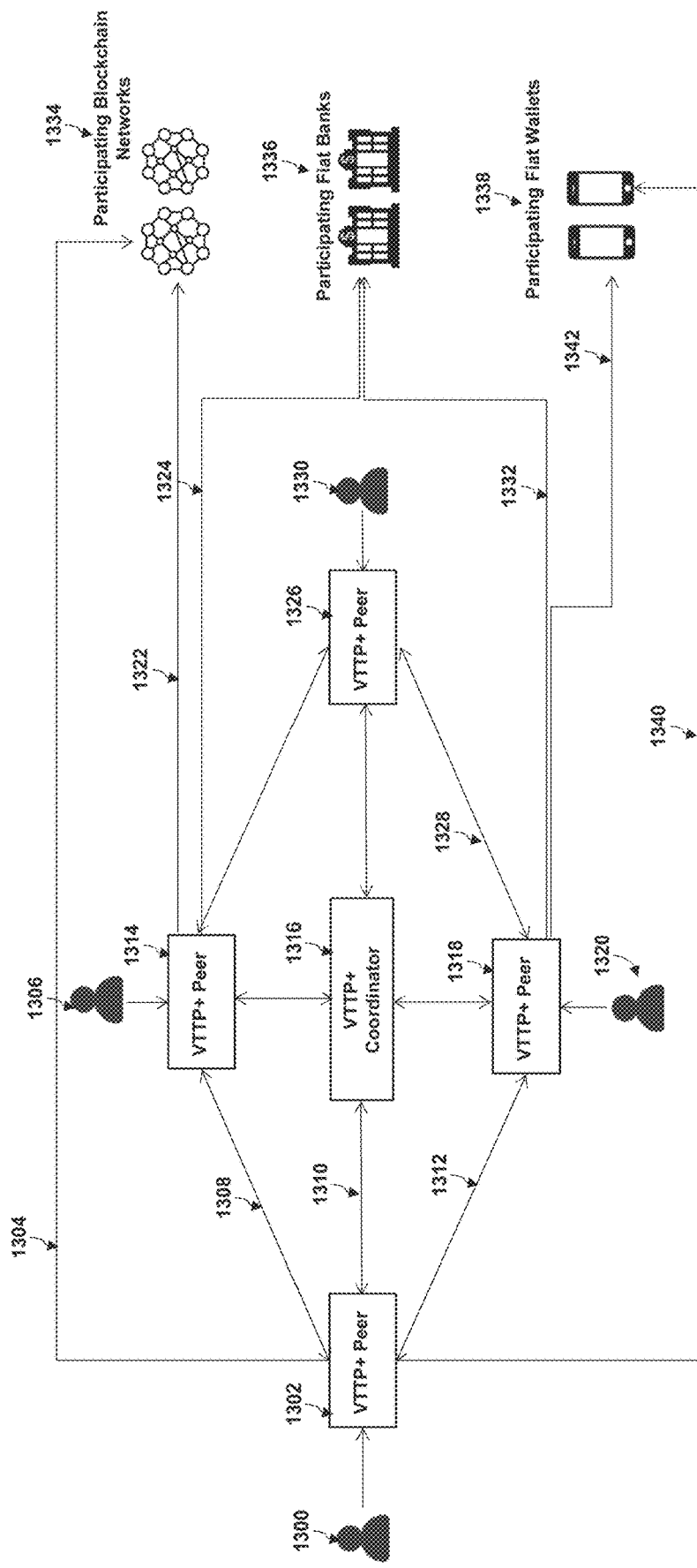
FIG. 20 is an illustration a VTTP+ peer-to-peer model, according to an embodiment of the invention.

Referring now to FIG. 20, a VTTP+ peer-to-peer model is described in more detail. In the peer-to-peer model, VTTP+ works as a peer-to-peer protocol where VTTP+ peers 1302, 1314, 1318, 1326 operated by respective users 1300, 1306, 1320, 1330 communicate 1308, 1312, 1328 directly with their peers. A VTTP+ coordinator 1316 may be used for coordinating 1310 the communication between peers. VTTP+ peers 1302, 1314, 1318, 1326 generate and send transactions 1304, 1322, 1324, 1332, 1340, 1342 to participating blockchain networks 1334, participating fiat banks 1336 and participating fiat wallets 1338, to execute a value transfer.

Figure 21:
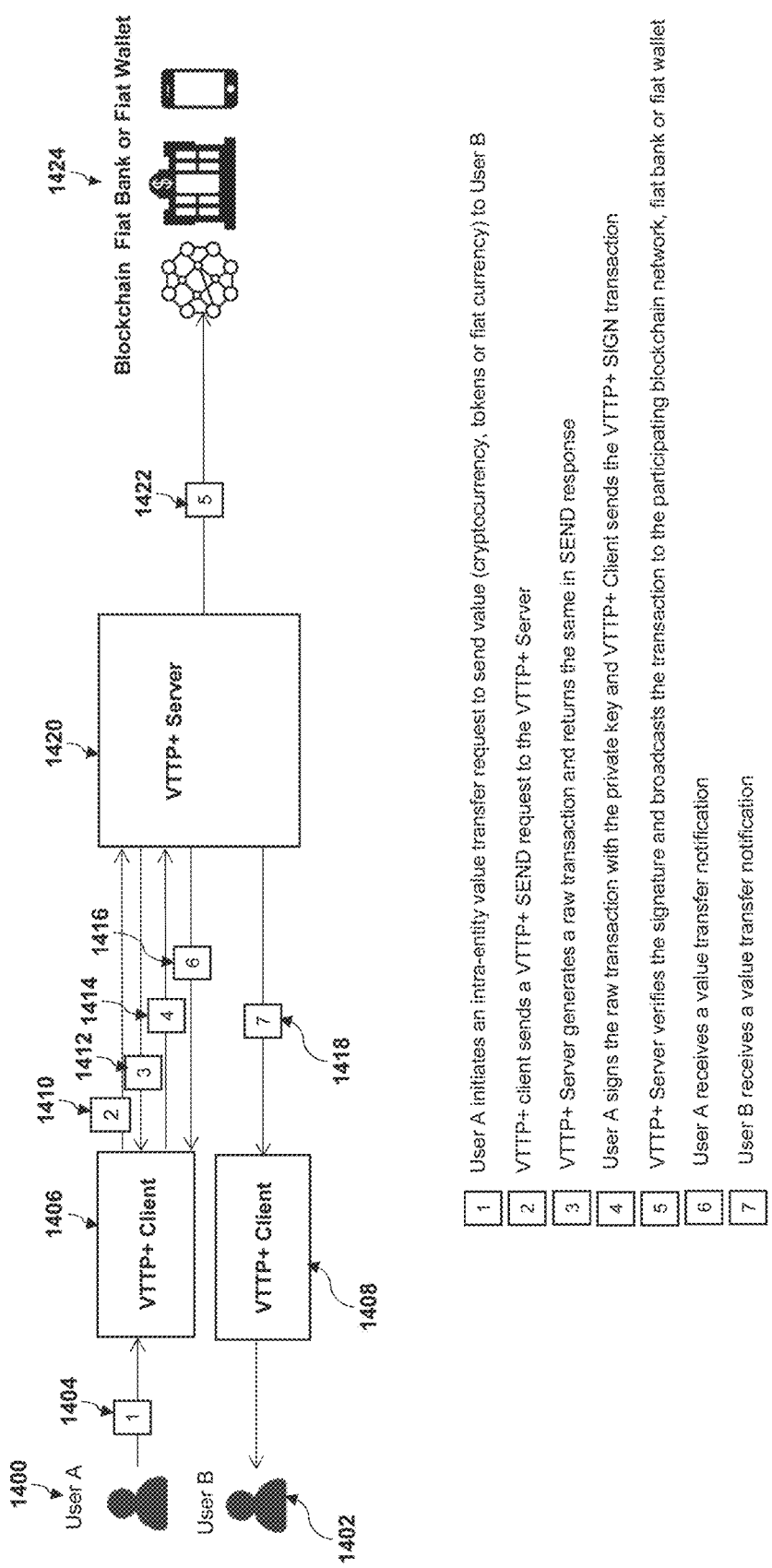
FIG. 21 is an illustration of a VTTP+ intra-entity value transfer process, according to an embodiment of the invention.

Referring now to FIG. 21, a VTTP+ intra-entity value transfer process is described in more detail. The VTTP+ intra-entity value transfer process enables transfer of cryptocurrency, tokens or fiat currency from one account to another account on the same entity (such as a participating blockchain network, participating fiat bank or participating fiat wallet). In the present embodiment, an intra-chain value transfer request may comprise a User A 1400 wanting to transfer certain units of a cryptocurrency, tokens or fiat currency from an account on an entity 1424 (participating blockchain network, participating fiat bank or participating fiat wallet) to the account of another User B 1402 on the same entity 1424. At step 1 1404, User A 1400 initiates value transfer request to send cryptocurrency, tokens or fiat currency to User B 1402 (e.g. to send 1 ETH from User A to User B, or $1 from user A to user B). At step 2 1410, a VTTP+ client 1406 associated with User A 1400 sends a VTTP+ SEND request to the VTTP+ server 1420. At step 3 1412, the VTTP+ server 1420 generates a raw transaction and returns the same in a SEND response to the VTTP+ client 1406 for User A 1400. At step 4 1414, User A 1400 signs the raw transaction with a private key comprised by the VTTP+ client 1406 and the VTTP+ client 1406 sends the VTTP+ SIGN transaction to the VTTP+ server 1420. At step 5 1422, the VTTP+ server 1420 verifies the signature and broadcasts the transaction to the entity 1424. At step 6 1416, User A 1400 receives a value transfer notification via the VTTP+ client 1406. At step 7 1418, User B 1402 receives a value transfer notification via a VTTP+ client 1408 associated with User B 1402.

Figure 22:
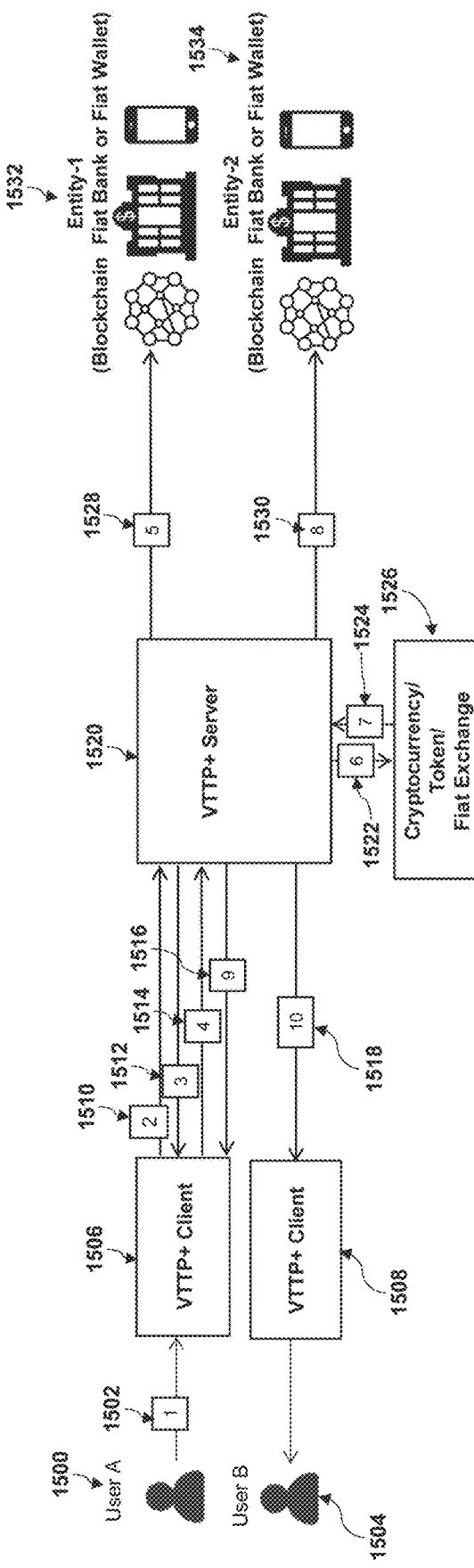
FIG. 22 is an illustration of a VTTP+ inter-entity value transfer process, according to an embodiment of the invention.

Referring now to FIG. 22, a VTTP+ inter-entity value transfer process is described in more detail. The VTTP+ inter-entity value transfer process enables transfer of cryptocurrency, tokens or fiat currency from an account on an entity (such as a participating blockchain network, participating fiat bank or participating fiat wallet) to another account on a different entity. At step 1 1502, a User A 1500 initiates an inter-entity value transfer request to a User B 1504 (e.g. to send 1 ETH from user A to user B who receives the value in equivalent number of USD). At step 2 1510, a VTTP+ client 1506 associated with User A 1500 sends a VTTP+ SEND request to a VTTP+ server 1520. At step 3 1512, the VTTP+ server 1520 generates a raw transaction and returns the same in a SEND response to the VTTP+ client 1506. At step 4 1514, User A 1500 signs the raw transaction with a private key comprised by the CTTP+ client 1506 and the VTTP+ client 1506 sends the VTTP+ SIGN transaction to the VTTP+ server 1520. At step 5 1528, the VTTP+ server 1520 verifies the signature and broadcasts the transaction to the entity-1 1532. At step 6 1522, when the value transfer from an account associated with User A 1500 on entity-1 1532 to a Vault account on entity-1 1532 is confirmed, the cryptocurrency, tokens or fiat currency are sent to a Cryptocurrency/Token/Fiat Exchange account 1526. At step 7 1524, cyptocurrency, tokens or fiat currency are exchanged. At step 8 1530, the exchanged cyptocurrency, tokens or fiat currency are sent to an account associated with User B 1504 on entity-2 1534. At step 9 1516, User A 1500 receives a value transfer notification via the VTTP+ client 1506. At step 10 1518, User B 1504 receives a value transfer notification via a VTTP+ client 1508 associated with User B 1504.

Figure 23:
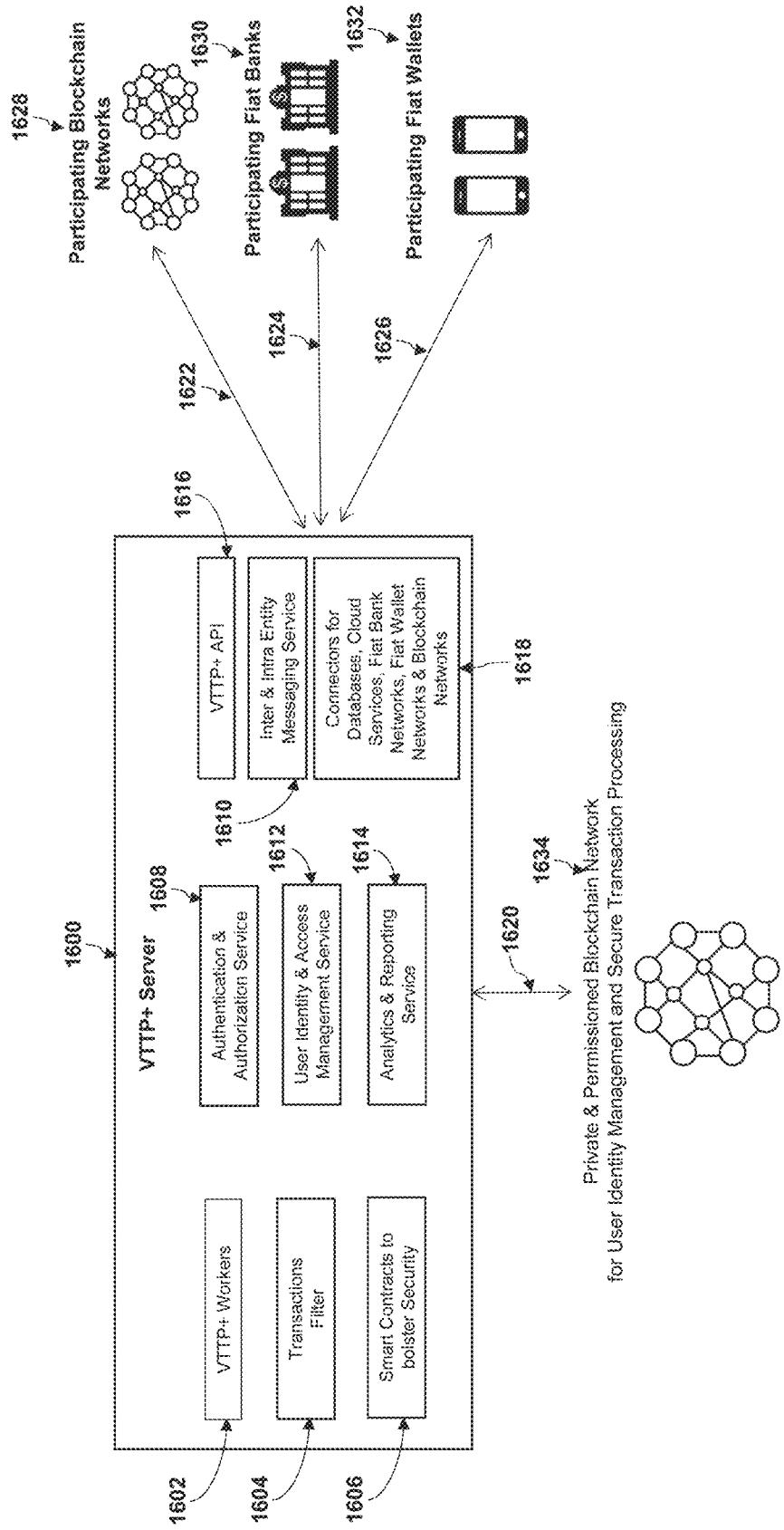
FIG. 23 is an illustration of an exemplary VTTP+ server architecture, according to an embodiment of the invention.

Referring now to FIG. 23, an exemplary VTTP+ server architecture, is described in more detail. A VTTP+ server 1600 may have one or more VTTP+ Workers 1602 that are individual services to process VTTP+ requests and execute the VTTP+ commands sent by VTTP+ clients. The VTTP+ server 1600 may further comprise a VTTP+ API 1616 that allows the participating blockchain networks 1628, participating fiat banks 1630 and participating fiat wallets 1632 to use VTTP+ protocol for exchange of value. A separate blockchain network 1634 may be positioned in communication 1620 with the VTTP+ server 1600 and used for user identity and access management. The VTTP+ server 1600 may further comprise additional services, such as a User Identity & Access Management Service 1612, an Authentication & Authorization Service 1608, and an Analytics & Reporting Service 1614. The VTTP+ server 750 may further comprise inter- and intra-entity messaging services 1610 and connectors for databases, cloud services, fiat bank networks, fiat wallet networks & blockchain networks 1618. A transactions filter 1604 may be comprised by the server 1600 for filtering transactions. The server 1600 may use various Smart Contracts 1606 to bolster security. These smart contracts 1606 may be executed for each VTTP+ request and perform additional verification (such as verifying sender and receiver's address). The smart contracts may enforce checks such as time limits or quantity restrictions. Some smart contracts may perform functions similar to virus filters, for filtering out suspicious transactions. New smart contracts can be distributed to VTTP+ servers in a manner similar to virus updates.

Figure 24:
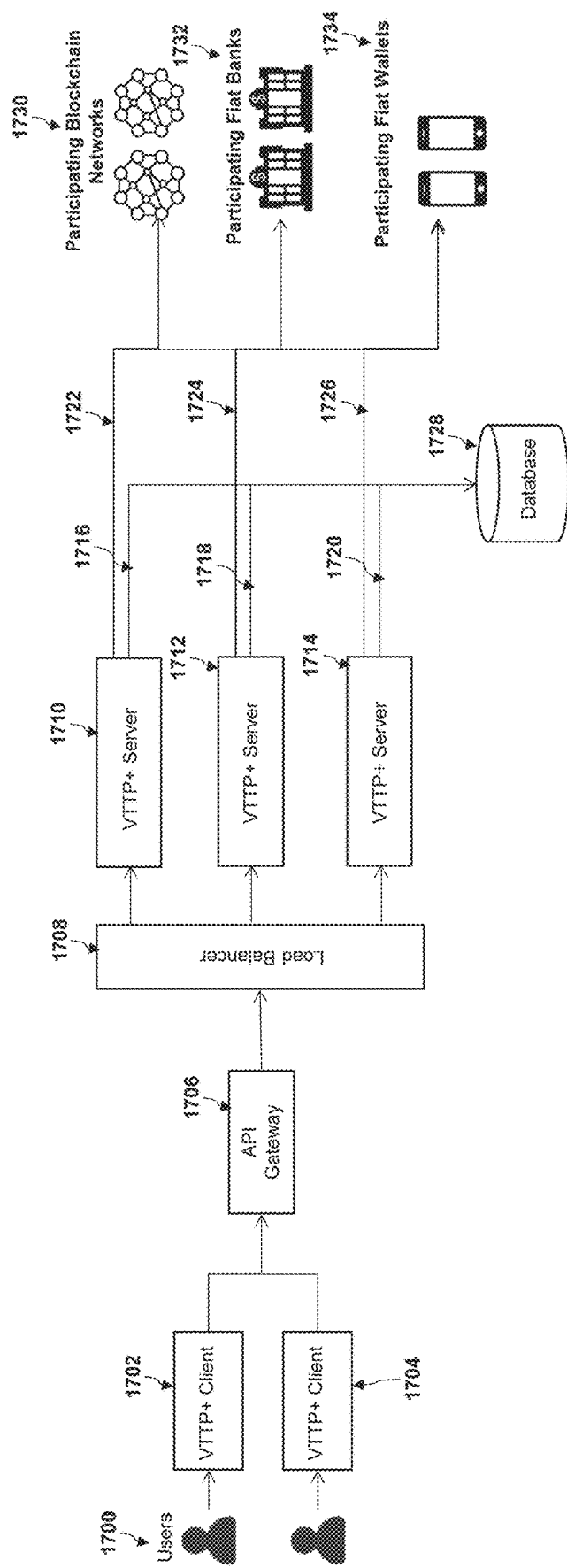
FIG. 24 is an illustration of an exemplary VTTP+ reference architecture, according to an embodiment of the invention.

Referring now to FIG. 24, an exemplary VTTP+ reference architecture is described in more detail. Users 1700 may use VTTP+ clients 1702, 1704 to communicate with VTTP+ servers 1710, 1712, 1714 through an API gateway 1706. The VTTP+ servers 1710, 1712, 1714 sit under a load balancer 1708 and expose a number API endpoints. The API gateway 1706 makes these APIs available to the VTTP+ clients 1702, 1704. Each API has an endpoint (for example, vttps://example.com/ethereum) and a set of VTTP+ methods or commands which are supported for the endpoint (such as GET, SEND, REQUEST, etc.). The API gateway 1706 may use an API key to enable authentication for APIs. The API gateway 1706 may also perform additional functions such as logging each API request and rate-limiting of requests. A separate relational (SQL) or non-relational (NoSQL) database 1728 may be used to store data such as user credentials and application specific data. Each VTTP+ server 1710, 1712, 1714 is connected to all participating blockchain networks 1730, participating fiat banks 1732 and participating fiat wallets 1734.

Figure 25:
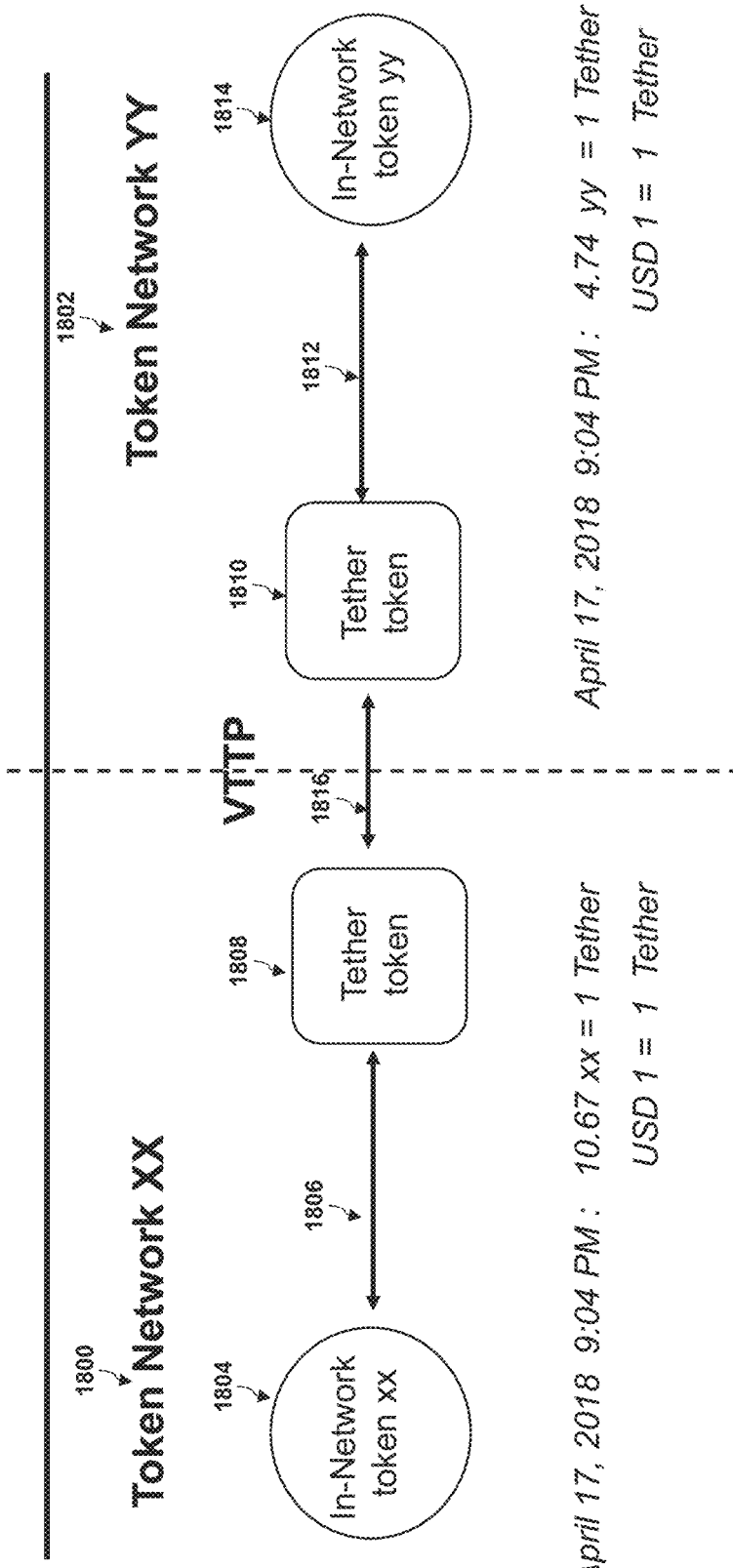
FIG. 25 is an illustration of an exemplary scenario of value transfer between two networks which use common universal tether tokens, according to an embodiment of the invention.

Referring now to FIG. 25, an illustration of an exemplary scenario of value transfer between two networks which use common universal tether tokens is described in more detail. A first blockchain network XX 1800 uses an in-network token xx 1804 and a tether token 1808, where the in-network token xx 1804 can be exchanged 1806 for the tether token 1808. A second blockchain network YY 1802 uses an in-network token yy 1814 and a tether token 1810, where the in-network token yy 1814 can be exchanged 1812 for the tether token 1810. The tether tokens 1808 and 1810 used in the two networks 1800 and 1802 is the same. The common tether token 1808, 1810 may be tethered to a stable fiat currency like USD which is external to blockchain networks XX and YY 1800, 1802. Current cryptocurrency exchanges use a tether token such as USD Tether (USDT) and a user can sell any cryptocurrency/token and convert to USDT and then use it to get any other cryptocurrency/token on the same exchange. However, current cryptocurrency exchanges don't allow transfer of the tether token (such as USDT) from one exchange to another. A user can sell a cryptocurrency/token (such as BTC) on a first exchange to get USDT but the user cannot transfer USDT to a second exchange to buy another cryptocurrency/token (such as ETH). The use of a common tether token and VTTP/VTTP+ enables exchange of tokens 1816 between different token networks. The cost per in-network token transaction is very low (near zero), and conversion of tether to fiat is only done infrequently based on a time period or a certain number of transactions.

Figure 26:
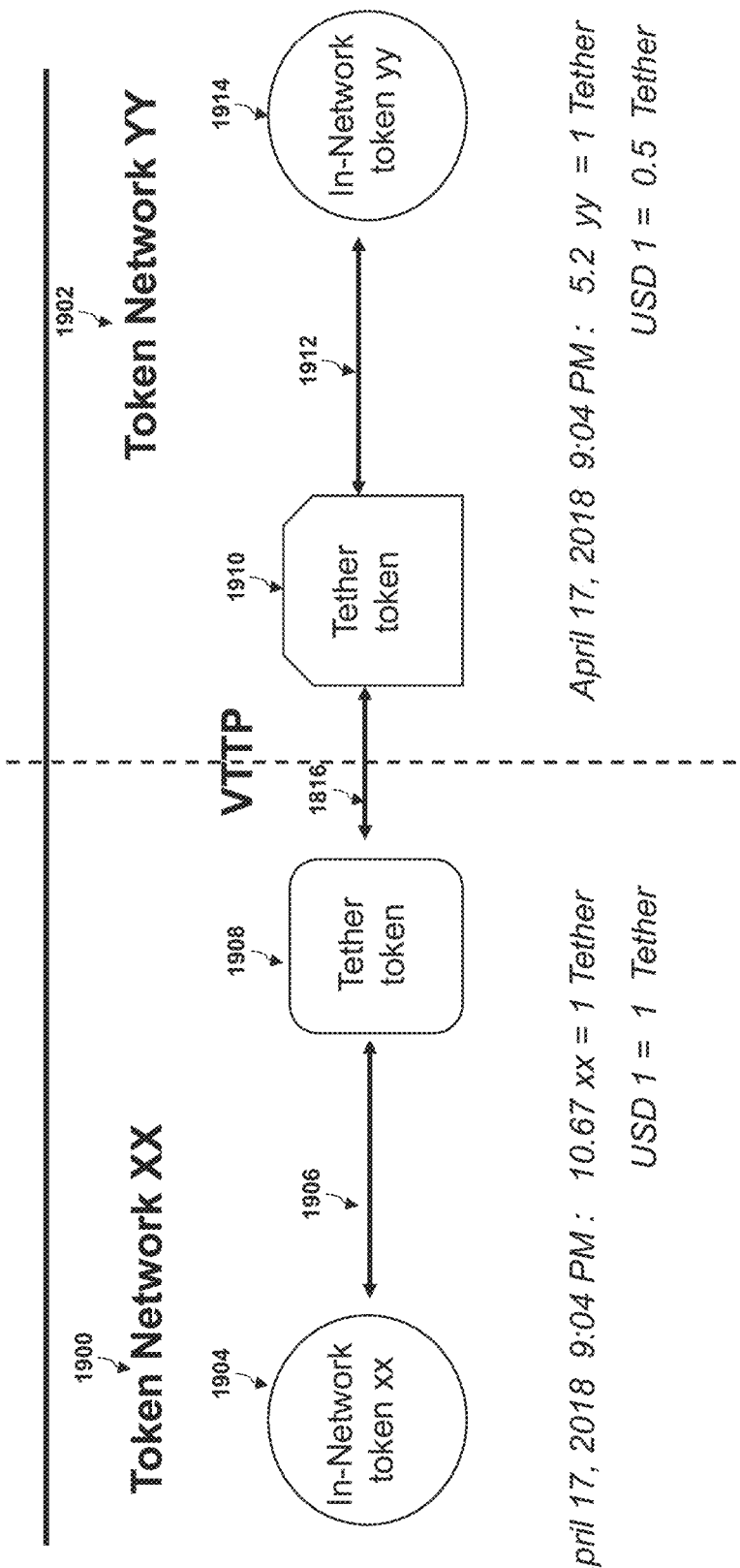
FIG. 26 is an illustration of an exemplary scenario of value transfer between two networks which use different tether tokens, according to an embodiment of the invention.

Referring now to FIG. 26, an illustration of an exemplary scenario of value transfer between two networks which use different tether tokens, is described in more detail. A first blockchain network XX 1900 uses an in-network token xx 1904 and a tether token 1908, where the in-network token xx 1904 can be exchanged 1906 for the tether token 1908. A second blockchain network YY 1902 uses an in-network token yy 1914 and a tether token 1910, where the in-network token yy 1914 can be exchanged 1912 for the tether token 1910. The tether tokens 1908 and 1910 used in the two networks 1900 and 1902 are different. The use of different tether tokens and VTTP/VTTP+ enables exchange of tokens between different token networks. This different tether token approach may be beneficial where the blockchain networks XX and YY 1900, 1902 operate in different countries and national governments require local tether tokens so that money can't leave the borders to provide local guarantees for safety of consumers. Accordingly, in some embodiments, tether token 1908 may be tethered to a first fiat currency and tether token 1910 may be tethered to a second fiat currency different from the first fiat currency. Moreover, as a result of tether token 1910 being tethered to a second fiat currency, the value of the tether token 1910 may be expressed in terms of the first fiat currency that is proportionate to the conversion ratio between the first and second fiat currencies. In the present example, the tether token 1910 has a conversion ratio of 0.5 per 1 USD. The cost per in-network token transaction is very low (near zero), and conversion of tether to fiat is only done infrequently based on a time period or a certain number of transactions.

Figure 27:
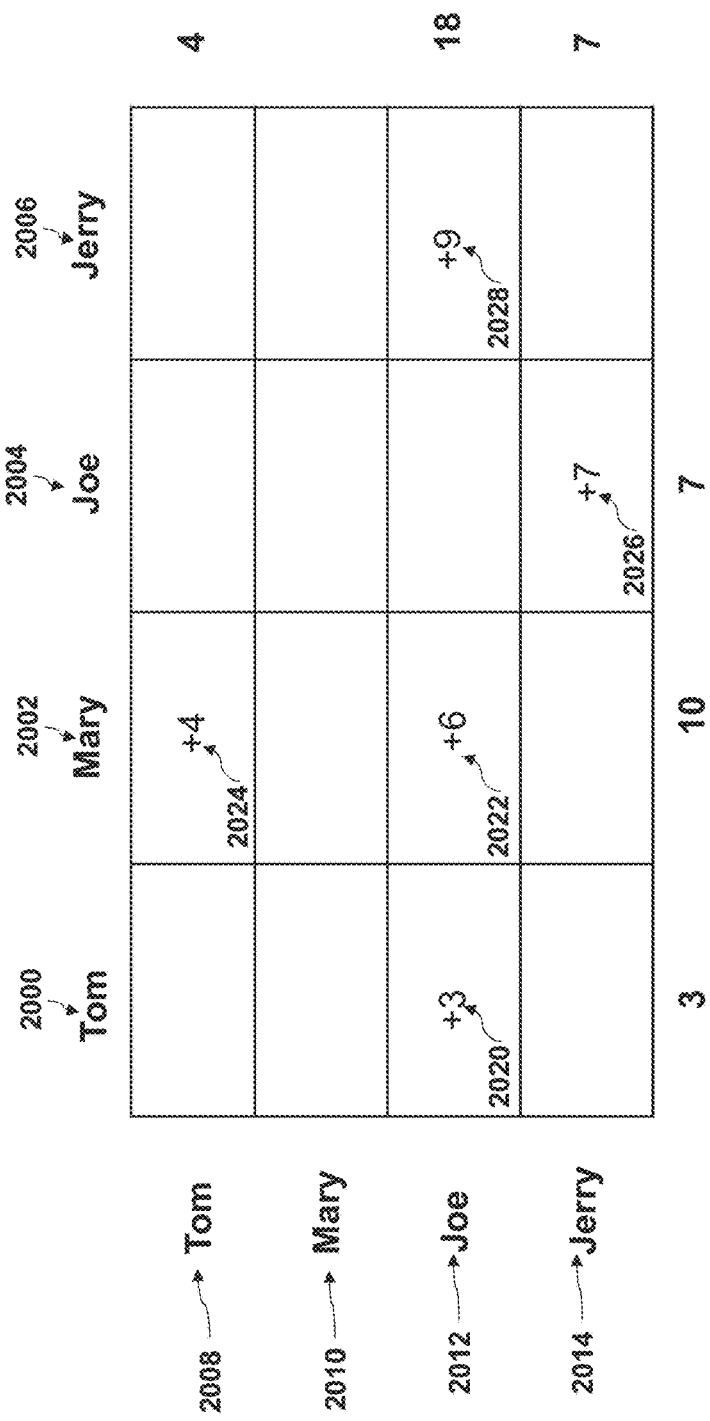
FIG. 27 is an illustration of an exemplary scenario of aggregation transactions of in-network tokens, according to an embodiment of the invention.

Referring now to FIG. 27, an illustration of an exemplary scenario of aggregation of in-network tokens is described in more detail. In the embodiment shown in FIG. 27, there are four users. The present embodiment describes individual in-network transactions between users. The users Tom, Mary, Joe, and Jerry may each have user account addresses on a blockchain network that uses the in-network tokens. A plurality of transaction requests may be received, with each transaction action comprising a sending user account address, a receiving user account address, and a transaction value expressed in terms of a quantity of in-network tokens. The transactions may each have an associated transaction request smart contract recorded to the blockchain network, defining a plurality of transaction request smart contracts. FIG. 27 depicts the transactions with receiving user account addresses 2000, 2002, 2004, 2006 and sending user account addresses 2008, 2010, 2012, 2014 for the users. A first transaction request 2020 may comprise Joe 2012 as the sending user account address, Tom 2000 as the receiving user account address, and a transaction amount of three in-network. A second transaction request 2022 may comprise Joe 2012 as the sending user account address, Mary 2002 as the receiving user account address, and a transaction amount of 6 in-network tokens. A third transaction request 2024 may comprise Tom 2008 as the sending user account address, Mary 2002 as the receiving user account address, and a transaction amount of four in-network tokens. A fourth transaction request 2026 may comprise Jerry 2014 as the sending user account address, Joe 2004 as the receiving user account address, and a transaction amount of 7 in-network tokens. A fifth transaction request 2028 may comprise Joe 2012 as the sending user account address, Jerry 2006 as the receiving user account address, and a transaction amount of 9 in-network tokens. Each user's aggregation account values are calculated in tethered tokens as shown, for instance, with Joe having a net debit of 11 in-network tokens that is converted to a value of 5.5 negative (or debited) tethered tokens, based on a conversion ratio of 2 in-network tokens for one tethered token). Determination of aggregation account value results in some user account addresses having a net credit, defining a credit user account address, and other user account addresses having a net debit, defining debit user account addresses. The aggregation of transactions may be recorded to an aggregate transaction record. Such a record may be recorded in a smart contract on the blockchain network. In some embodiments, the aggregate transaction record smart contract may comprise an address for each smart contract associated with the plurality of transaction requests. Prior to processing each transaction request, a balance check procedure may be performed do determine if each user account has a present permitted transaction amount that is sufficient to cover a debit of tokens as indicated in the transaction request. If there is a present permitted transaction amount of 15 in-network tokens for Joe, he is still allowed to "spend" 18 in-network tokens since he is credited 7 tokens from Jerry, bringing his update permitted transaction amount to 11 at the time the entire set of in-network tokens is synchronized into tethered tokens as an aggregated batch. The execution of the net transaction amount may occur upon reaching an aggregation threshold, that may be based on time, such a predefined length of time since a previous net transaction execution, value periods, a gross transaction amount (i.e. the total value of each transaction), or a risk tolerance based upon at least one of the conversion ratio, the net transactions, the present permitted transaction amount of one, some, or all of the user account addresses, or combinations thereof. The net transaction may be recorded to a net transaction smart contract on the blockchain network. Further, should there be tax or other implications for certain individual in-network transactions, or transaction costs, smart contracts will calculate taxes and/or transaction costs for individual in-network transactions and store them on the blockchain for retrieval and analysis. The VTTP services can monitor dynamic behavior of the users and the transactions and collection statistical data that may be used to adjust the period over which aggregation may take place, or its frequency based on the volume of the transactions and their relative amounts in a manner to minimize transaction costs (primarily through conversions to fiat currency, if any). Further transaction limits in terms of amounts of tokens permitted for each user may also be based on the statistics collected to ensure that risk is minimized. These analytics functionalities may assist the operators of the exchanges and VTTP services to maximize throughput and efficiency while minimizing risk and improving their cost and revenues.

In some embodiments, where a sending user account address is determined to not have a present permitted transaction amount greater than a transaction amount of a transaction request, the transaction request may be re-processed, including a redetermination of if the transaction value is greater than the present permitted transaction amount of the sending user account address after at least one of a first time interval and an intervening transaction including the sending user account address. Such re-processing may be defined as a transaction retry. There may be one or more transaction retry attempts. In some embodiments, there may be a limit to transaction retry attempts based on a fixed number of attempts or a second time interval measured from the original transaction request or the first transaction retry attempt.

Figure 28:
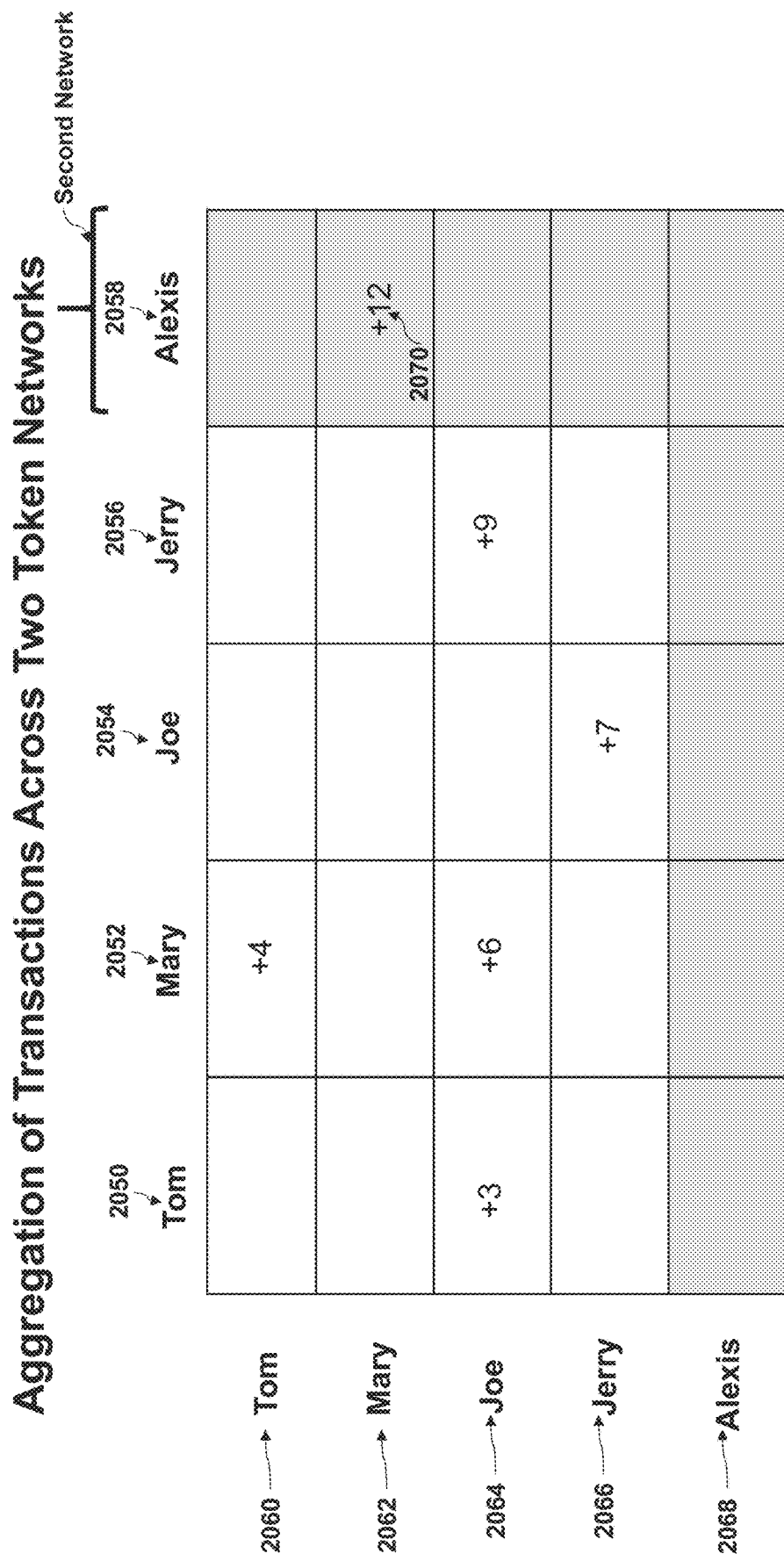
FIG. 28 is an illustration of an exemplary scenario of aggregation of transactions across two blockchain networks utilizing respective first and second in-network tokens, according to an embodiment of the invention.

Referring now to FIG. 28, an illustration of an exemplary scenario of aggregation of transactions across two token networks, is described in more detail. As noted in FIG. 28, in this embodiment there are five users, where the fifth user belongs to a second and different blockchain network that has a different second tethered token. A transaction request 2070 comprising Mary 2062 as the sending user account address and user Alexis 2058 as the receiving user account address on the second blockchain ratio, and a transaction amount of 12 first in-network tokens. An amount of first in-network tokens equal in value to the net credit to Alexis 2058, defining a net credit value, may be exchanged for an amount of first tethered tokens having a value equal to the net credit value. The first tethered tokens resulting from this exchange may be comprised by a first tethered token transfer record that may be recorded to the first blockchain network. A transaction of sending the tokens comprised by the first tethered token transfer record to a tethered token exchange may be recorded to the first blockchain network, similar to the procedure shown in FIG. 22. The first tethered tokens may be exchanged for an amount of second tethered tokens having a value equal to the net credit value. The second tethered coins resulting from the exchange may be comprised by a second tethered token transfer record. A transaction of receiving the tokens comprised by the second tethered token transfer record at the second blockchain network from the tethered token exchange may be recorded to the second blockchain network. Subsequently, the tokens comprised by the second tethered token transfer record may be exchanged on the second blockchain network for an amount of second in-network tokens having a value equal to the net credit value. The second in-network tokens resulting from this exchange may be defined as a second blockchain network deposit. The tokens of the second blockchain network deposit may then be deposited to the user account address on the second blockchain network associated with Alexis. The conversion ratio of the first tethered token in the first blockchain network to a second tethered token in a second blockchain network in the present embodiment is two to one. As noted, for user Alexis 2058 on the second blockchain network, there is a credit to her account of 3 second tethered tokens. assuming a ratio of 2 first tethered tokens of the first blockchain network being exchanged for one second tethered token on the second blockchain network. Accordingly, the first in-network token may have a first exchange rate with the first tethered token, the second in-network token may have a second exchange rate with the second tethered token, and the first tethered token may have a third exchange rate with the second tethered token.

In some embodiments, where a transaction request requires a conversion between two tethered tokens that are tethered to different fiat currencies, the present permitted transaction amount may be updated to reflect additional risk in the transaction resulting from the multiple exchange rates involved.

Figure 29:
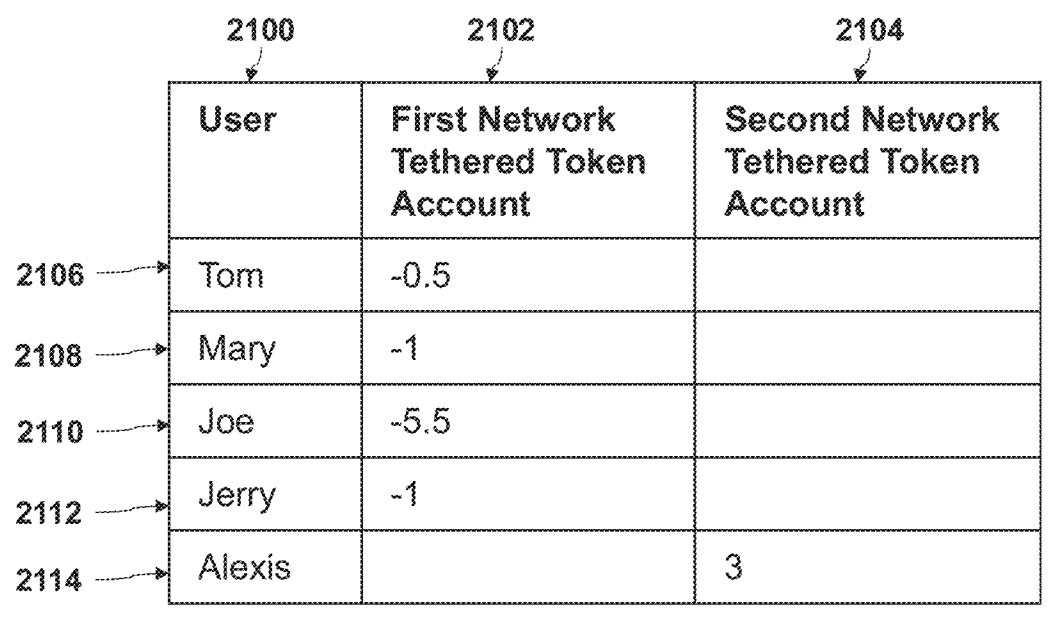

FIG. 29 shows an illustration of the result of an exemplary scenario of aggregation of transactions across two token networks in terms of the tethered tokens after suitable conversions. One may also consider embodiments that may modify the way the aggregation is done within the network and across the network, for instance, by operating on in-network tokens themselves, as opposed to converting to tethered tokens, should the business context be suitable for elimination of tethered tokens. The claims will determine the scope of our inventions, which may cover one or more of the embodiments discussed.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A method for securing blockchain value transfer transactions and updating security comprising:
  receiving a transaction request comprising an indication that the transaction request is associated with an update to a balance of an existing transaction smart contract, defining an updated transaction smart contract;
  applying a security smart contract to the transaction request; and
  recording to a present transaction amount limit record for an account associated with the updated transaction smart contract an indication that the updated transaction smart contract was made to the existing smart transaction contract, responsive to applying the security smart contract.

2. The method of claim 1 wherein the security smart contract is operable to at least one of verify a blockchain address associated with the transfer request, enforce a time limit, and enforce a quantity limitation.

3. The method of claim 1 further comprising:
  receiving a plurality of transaction requests;
  applying the security smart contract to each transaction request of the plurality of transaction requests, wherein at least a subset of the plurality of transaction requests comply with the security smart contract; and
  determining a net transaction from the at least a subset of the plurality of transaction requests.

4. The method of claim 3 wherein the indication recorded to the present transaction amount limit record is recorded responsive to the net transaction.

5. A method for securing blockchain value transfer transactions and updating security comprising:
  receiving a transaction request comprising an indication that the transaction request is associated with an update to a balance of an existing transaction smart contract, defining an updated transaction smart contract;
  applying a security smart contract to the transaction request, the security smart contract being operable to at least one of verify a blockchain address associated with the transfer request, enforce a time limit, and enforce a quantity limitation;

recording to a present transaction amount limit record for an account associated with the updated transaction smart contract an indication that the updated transaction smart contract was made to the existing smart transaction contract, responsive to the applying the security smart contract.

6. The method of claim 5 further comprising:

receiving a plurality of transaction requests;

applying the security smart contract to each transaction request of the plurality of transaction requests, wherein at least a subset of the plurality of transaction requests comply with the security smart contract; and determining a net transaction from the at least a subset of the plurality of transaction requests.

7. The method of claim 6 wherein the indication recorded to the present transaction amount limit record is recorded responsive to the net transaction.

8. A method for securing blockchain value transfer transactions and updating security comprising:

receiving a plurality of transaction requests, each transaction request comprising an indication that the transaction request is associated with an update to a balance of an existing transaction smart contract, defining an updated transaction smart contract;

applying a security smart contract to each transaction request of the plurality of transaction requests, the security smart contract being operable to at least one of verify a blockchain address associated with the transfer request, enforce a time limit, and enforce a quantity limitation, wherein at least a subset of the plurality of transaction requests comply with the security smart contract;

recording to a present transaction amount limit record for an account associated with the updated transaction smart contract an indication that the updated transaction smart contract was made to the existing smart transaction contract, responsive to the applying the security smart contract; and determining a net transaction from the at least a subset of the plurality of transaction requests.

\* \* \* \* \*